US006573952B1

(12) United States Patent
Yamazaki et al.

(10) Patent No.: US 6,573,952 B1
(45) Date of Patent: Jun. 3, 2003

(54) GOGGLE TYPE DISPLAY DEVICE

(75) Inventors: Shunpei Yamazaki, Tokyo (JP); Yu Yamazaki, Tokyo (JP); Keisuke Hayashi, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 09/570,599

(22) Filed: May 12, 2000

(30) Foreign Application Priority Data

| May 14, 1999 | (JP) | ............................................ 11-134937 |
| Dec. 28, 1999 | (JP) | ........................................... 11-375154 |

(51) Int. Cl.$^7$ .......................... G02F 1/1335; G02C 1/00
(52) U.S. Cl. ............................ 349/13; 349/15; 349/11; 351/158
(58) Field of Search .......................... 349/11, 13, 15; 351/158

(56) References Cited

U.S. PATENT DOCUMENTS

| 5,162,828 A | * | 11/1992 | Furness et al. | ............. 353/122 |
| 5,561,538 A | * | 10/1996 | Kato et al. | .................... 359/40 |
| 5,585,871 A | * | 12/1996 | Linden | ........................ 351/158 |

(List continued on next page.)

FOREIGN PATENT DOCUMENTS

| DE | 196 54 591 | 7/1997 |
| EP | 0 592 318 | 4/1994 |
| JP | 7-130652 | 5/1995 |

(List continued on next page.)

OTHER PUBLICATIONS

European Search Report re application No. EP 00 10 9970, dated Jan. 12, 2001.

Schenk, H. et al., "Polymers for Light Emitting Diodes," *Eurodisplay '99 Proceedings of the 19th International Display Research Conference*, Sep. 6–9, 1999, Berlin, Germany, pp. 33–37, 1999.

Inui, S. et al, "Thresholdless Antiferroelectricity in Liquid Crystals and its Application to Displays," J. Mater. Chem., vol. 6, No. 4, pp. 671–673, 1996.

Yoshida, T. et al, "A Full Color Thresholdless Antiferroelectric LCD Exhibiting Wide Viewing Angle with Fast Response Time," SID 97 Digest, pp. 841–844, 1997.

Furue, H. et al, "Characteristics and Driving Scheme of Polymer–Stabilized Monostable FLCD Exhibiting Fast Response Time and High Contrast Ratio with Gray–Scale Capability," *SID 98 Digest*, pp. 782–785, 1998.

Inui, S. et al, "Thresholdless Antiferroelectricity in Liquid Crystals and its Application to Displays," *J. Mater Chem.*, vol. 6, No. 4, pp. 671–673, 1996.

Yoshida, T. et al, "A Full–Color Thresholdless Antiferroelectric LCD Exhibiting Wide Viewing Angle with Fast Response Time," SID 97 Digest, pp. 841–844, 1997.

Forue, H. et al, "Characteristic and Driving Scheme of Polymer–Stabilized Monostable FLCD Exhibiting Fast Response Time and High Contrast Ratio with Gray–Scale Capability," *SID 98 Digest*, pp. 782–785, 1998.

Schenk, H. et al, "Polymers for Light Emitting Diodes," *EuroDisplay '99, Proceedings of the 19th International Display Research Conference*, Berlin, Germany, Sep. 6–9, 1999, pp. 33–37.

(List continued on next page.)

*Primary Examiner*—Robert H. Kim
*Assistant Examiner*—Hoan C Nguyen
(74) *Attorney, Agent, or Firm*—Cook, Alex, McFarron, Manzo, Cummings & Mehler, Ltd.

(57) ABSTRACT

It is an object of the present invention to provide a goggle type display device for preventing a misalignment between a display element and an optical element. The present invention provides a goggle type display device having a display unit and an optical element wherein the display unit is integral with the optical element.

25 Claims, 28 Drawing Sheets

U.S. PATENT DOCUMENTS

| | | | | |
|---|---|---|---|---|
| 5,594,569 | A | 1/1997 | Konuma et al. | 349/122 |
| 5,643,826 | A | 7/1997 | Ohtani et al. | 437/88 |
| 5,682,210 | A | 10/1997 | Weirich | 348/739 |
| 5,923,962 | A | 7/1999 | Ohtani et al. | 438/150 |
| 5,999,237 | A * | 12/1999 | Miyawaki | 349/57 |
| 6,218,219 | B1 * | 4/2001 | Yamazaki et al. | 438/149 |

FOREIGN PATENT DOCUMENTS

| | | | |
|---|---|---|---|
| JP | 10-092576 | | 4/1998 |
| JP | 411124579 A | * | 5/1999 |
| JP | 11-167373 | | 6/1999 |
| JP | 200019485 A | * | 1/2000 |
| WO | WO-98/29775 | * | 7/1998 |

OTHER PUBLICATIONS

English abstract re Japanese patent application No. 7–130652, published May 19, 1995.

English abstract re Japanese patent application No. 10–092576, published Apr. 10, 1998.

English abstract re Japanese patent application No. 11–167373, published Jun. 22, 1999.

* cited by examiner

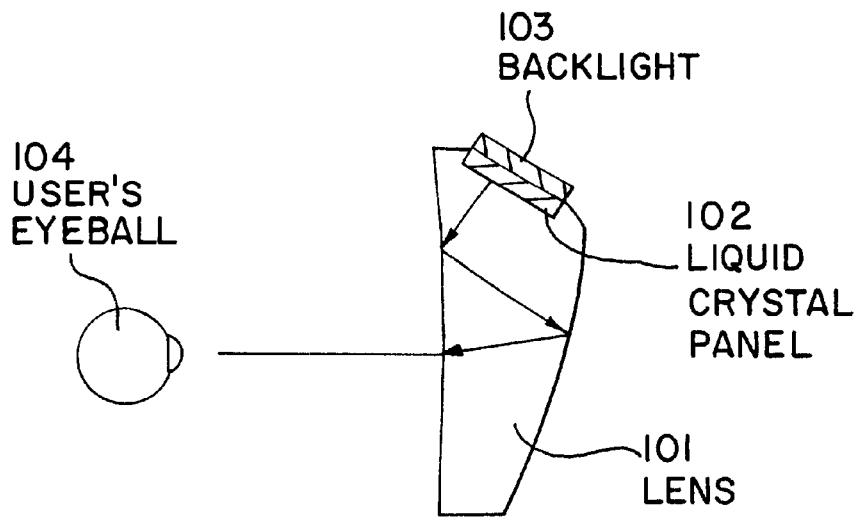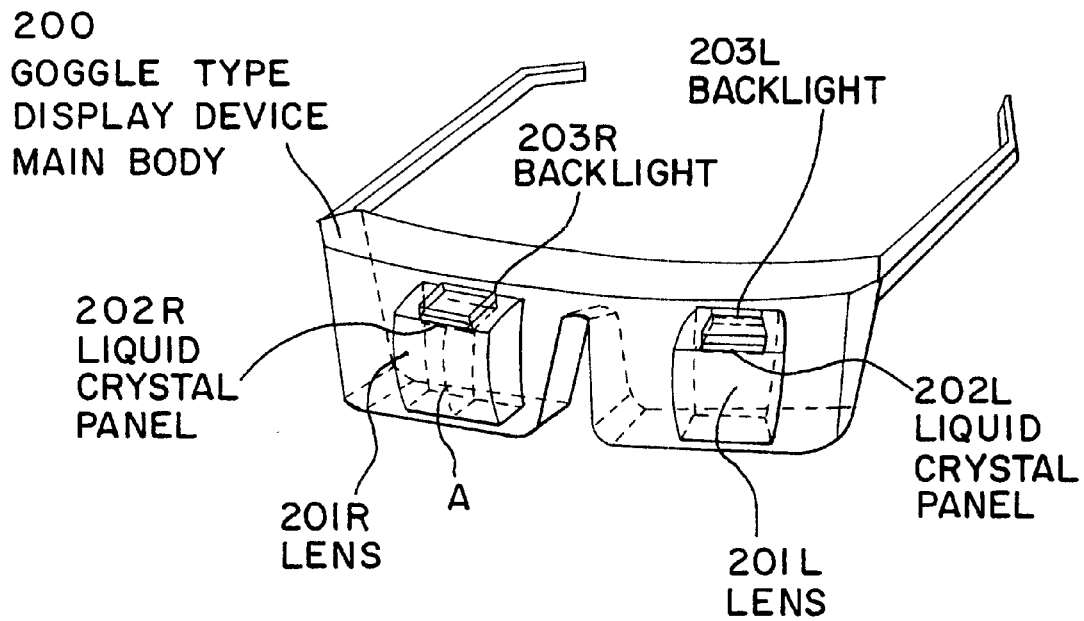

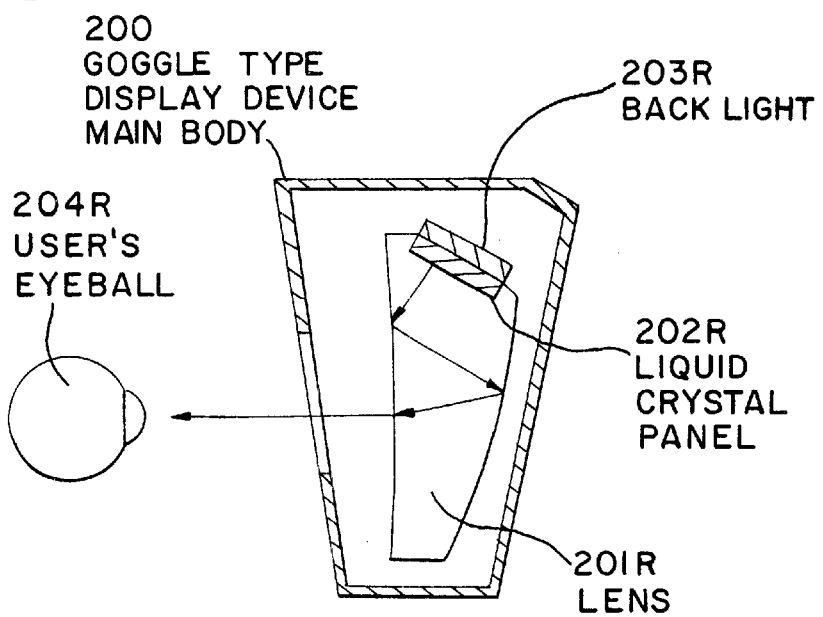
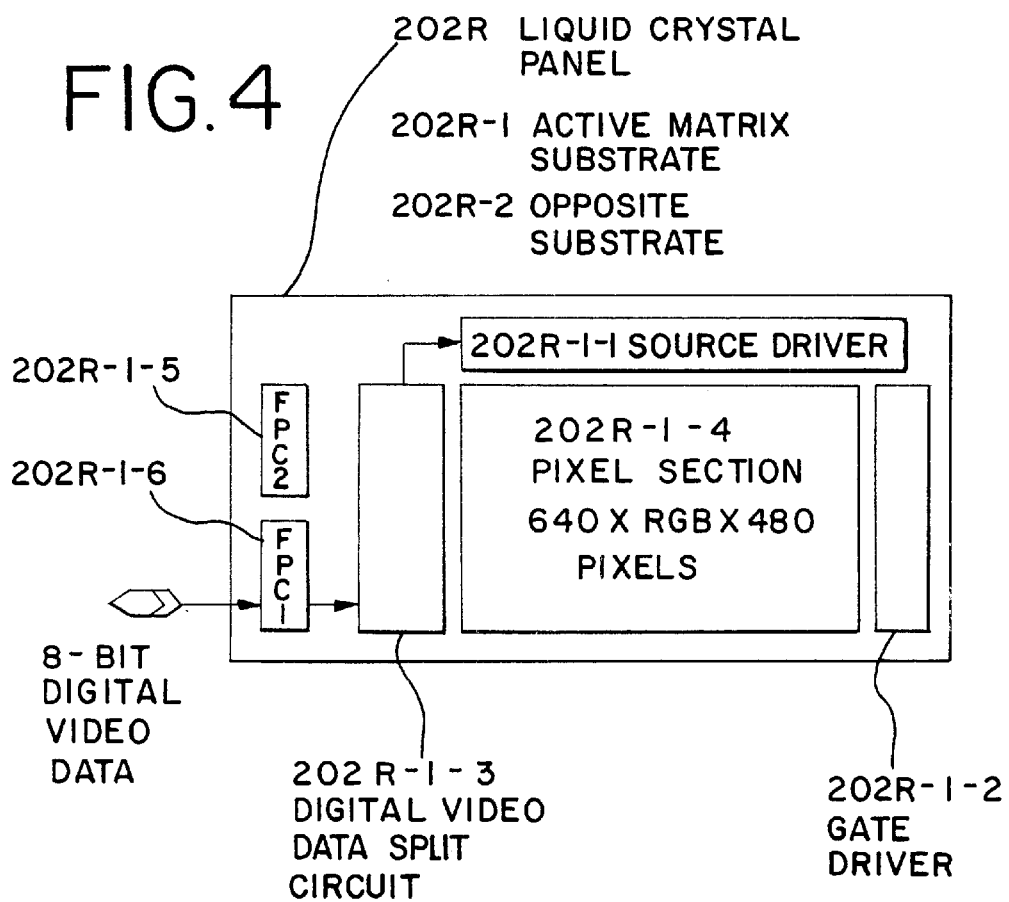

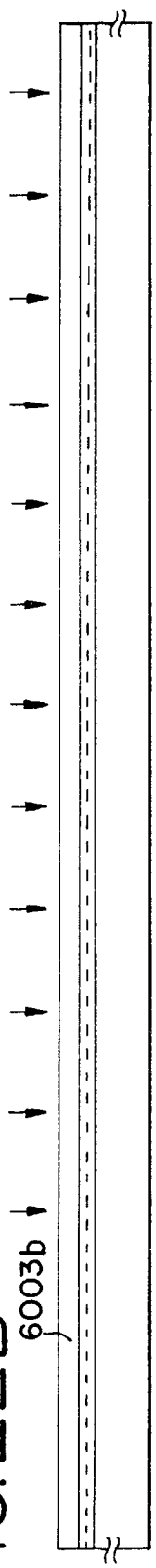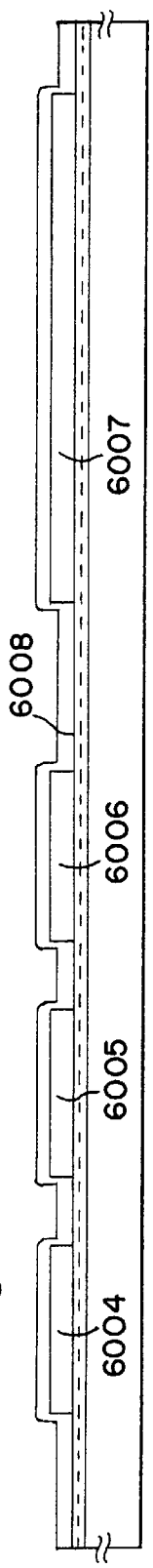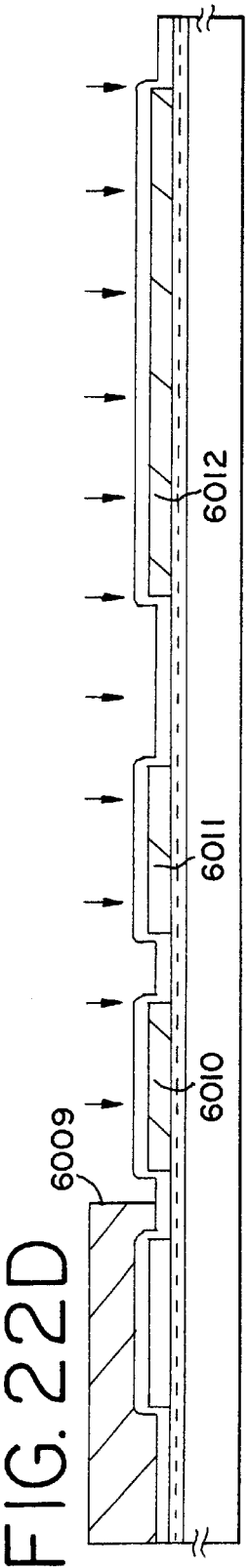
FIG. 22A AMORPHOUS SEMICONDUCTOR FILM FORMING STEP 6001 6002 6003a
FIG. 22B CRYSTALIZATION STEP 6003b
FIG. 22C MASK LAYER FORMING STEP 6004 6005 6006 6007 6008
FIG. 22D CHANNEL DOPE STEP 6009 6010 6011 6012

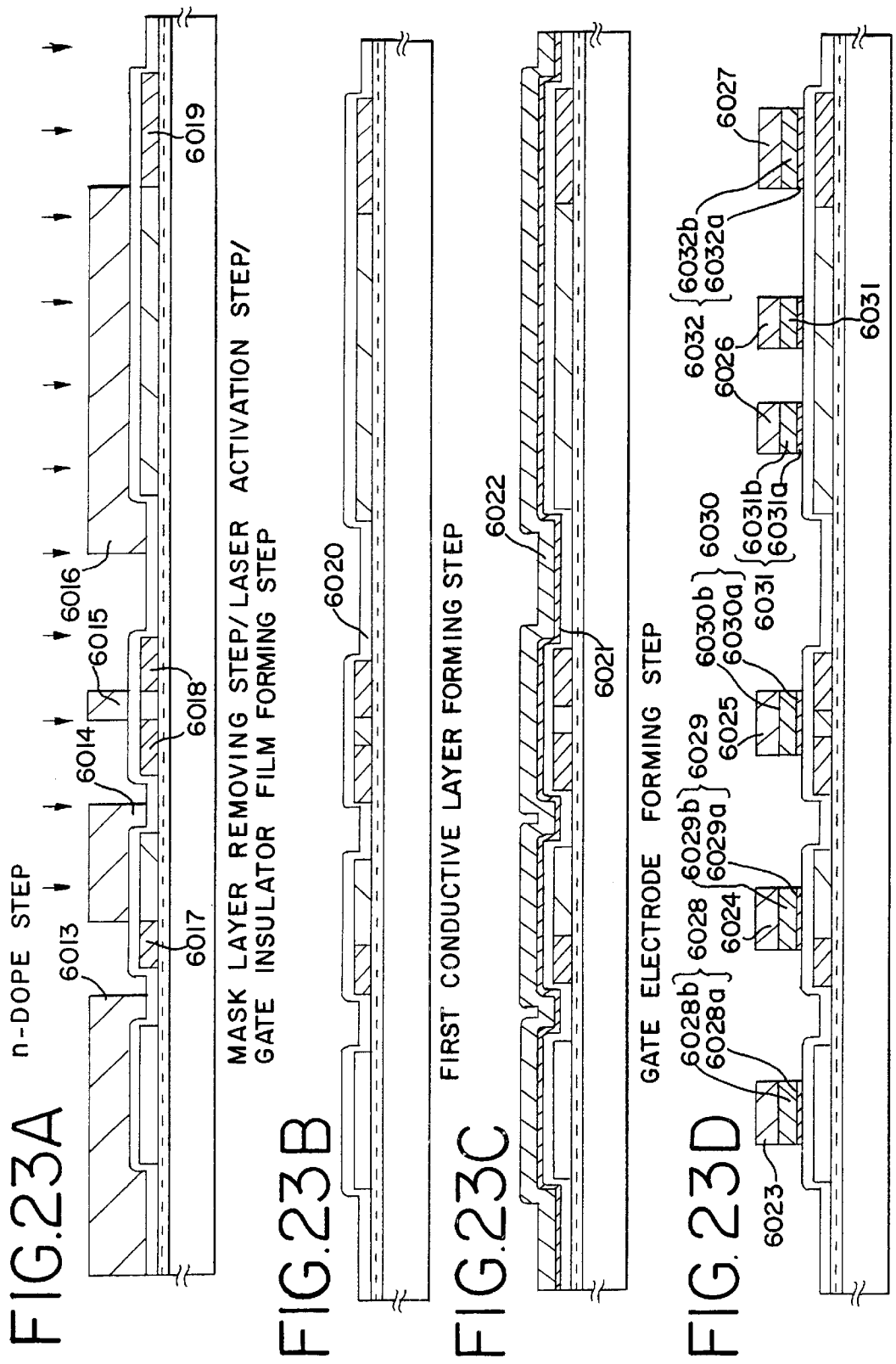

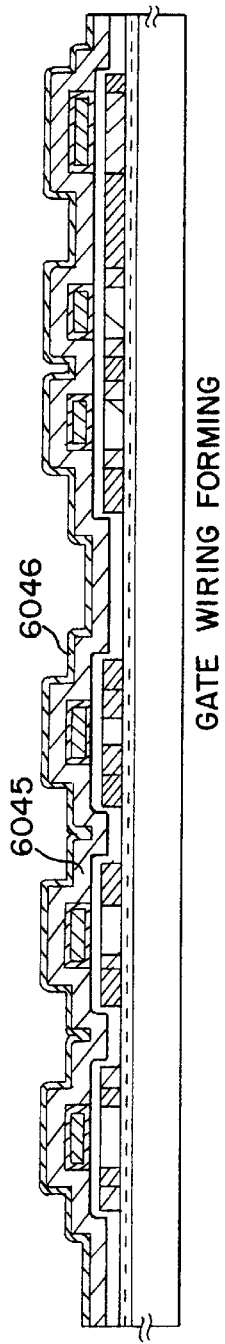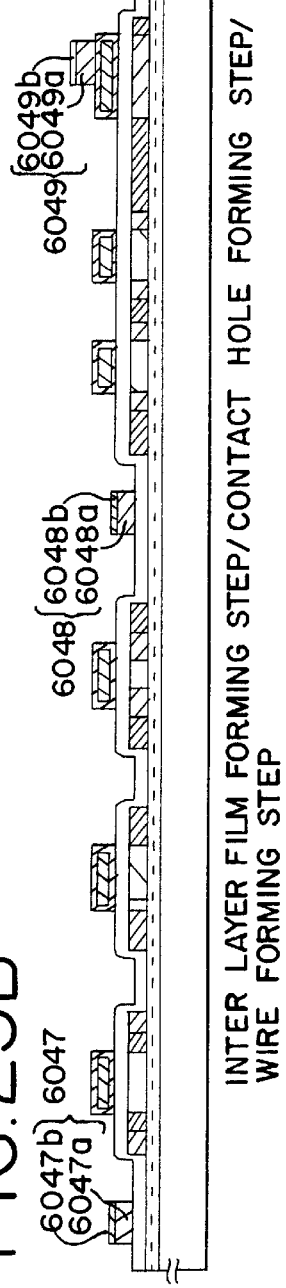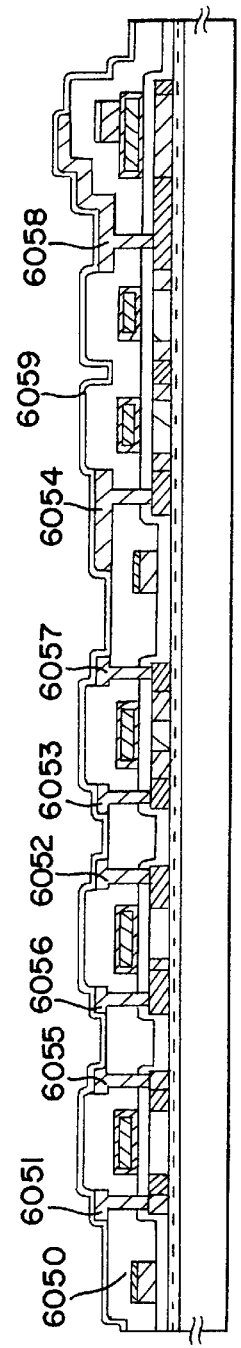
FIG.25A SECOND CONDUCTIVE LAYER FORMING STEP
FIG.25B GATE WIRING FORMING
FIG.25C INTER LAYER FILM FORMING STEP/CONTACT HOLE FORMING STEP/WIRE FORMING STEP
PASSIVATION FILM FORMING STEP

RESIN FILM FORMING STEP/CONTACT HOLE FORMING STEP/PIXEL ELECTRODE FORMING STEP

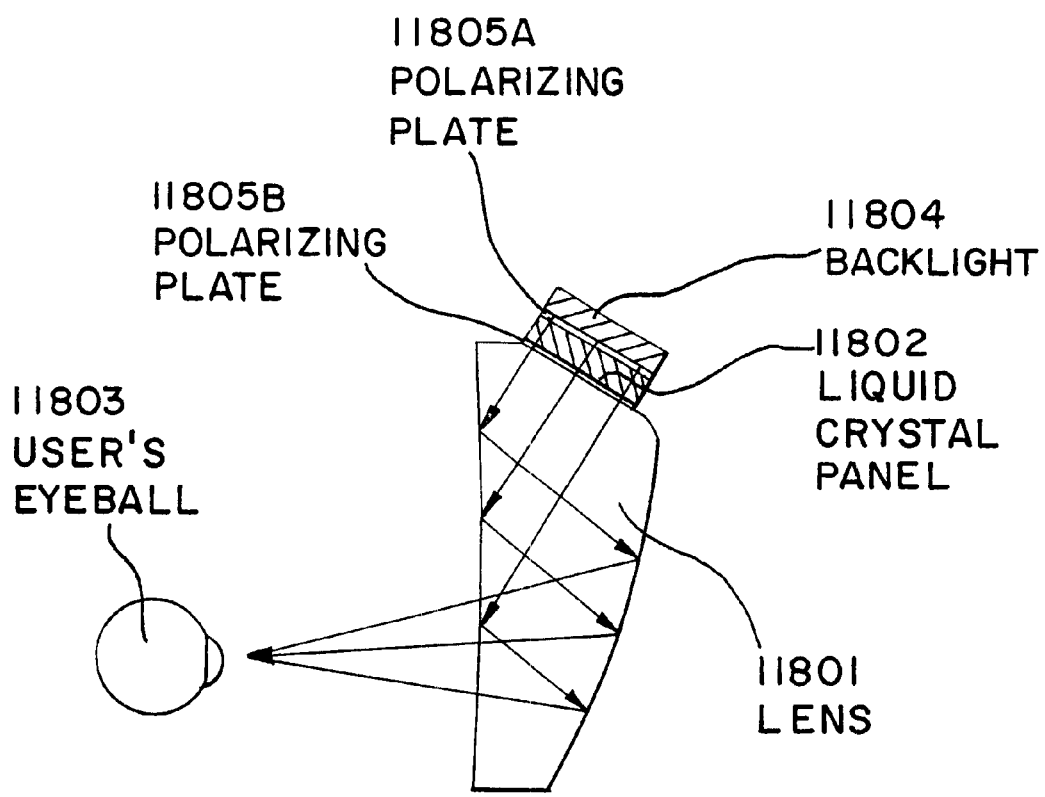

GOGGLE TYPE DISPLAY DEVICE

BACKGROUND OF THE INVENTION

1. Field of the Invention

The invention disclosed in the present specification relates to a goggle type display device. In the present specification, it is called a goggle type display device, but it sometimes called a head-mounted-display (HMD).

2. Description of the Related Art

In recent years, a goggle type display device which is mounted on the head of a user has come into widespread use. This goggle type display device is also called a HMD (head-mounted-display) and has a lens for enlarging an image to form a virtual image thereof and a display unit such as a liquid crystal panel arranged within a focal length of the lens. A user can appreciate the enlarged image by observing the display of the liquid crystal panel through the lens. Accordingly, the user can appreciate a large-screen display, though the goggle type display device is small in size.

Referring now to FIG. 45, an image displayed on a liquid crystal panel 11802 passes through a lens 11801 and is projected on the retina of a user's eyeball 11803. Here, it is necessary to place polarizing plates 11805A and 11805B on the liquid crystal panel 11802 and to use a backlight 11804 whose surface uniformly emits light as a light source.

A goggle type display device which can be used by a user while he is moving allows the user to see outside through a gap between the display device and his face for safety.

This goggle type display device is required to have high impact resistance as compared with a stationary display device because it is mounted on the head of the user as described above. In addition, since this goggle type display device is always moved while it is used, it is apt to produce a misalignment of an internal optical system as compared with the stationary display device.

A conventional goggle type display device presents a problem that since the display of the liquid crystal panel is observed through a lens, a misalignment between the liquid crystal panel and the lens directly results in degrading the quality of the display.

This goggle type display device is required to be small in size and light in weight because it is mounted on the head of the user. In addition, since the goggle type display device is carried by the user with him when it is used, its power consumption is required to be further reduced.

SUMMARY OF THE INVENTION

For these reasons, the present invention has been made in view of the above-mentioned problems. It is an object of the present invention to provide a goggle type display device for solving the above-mentioned problems.

The present invention adopts the following means to solve the above-mentioned problems. Referring now to FIG. 1, in FIG. 1 are shown a lens of an optical element, a liquid crystal panel of an image display part, and a backlight which are used in a goggle type display device in accordance with the present invention. According to the present invention, the liquid crystal panel is fixed to the lens to prevent a misalignment in the relative position between the liquid crystal panel and the lens.

In FIG. 1, a reference numeral 101 designates a lens, a reference numeral 102 designates a liquid crystal panel, a reference numeral 103 designates a backlight, and a reference numeral 104 designates a user's eyeball. In the lens 101 is previously made a groove in which the liquid crystal panel is fixed and in the groove is built the liquid crystal panel 102.

In this connection, the backlight 103 may be fixed to the liquid crystal panel 102 or to the lens 101.

As described above, according to the present invention, the relative position between the liquid crystal panel for displaying an image and the optical element (lens) for enlarging the image and for projecting it on the user's eyeball does not vary with time. Accordingly, this goggle type display device is free from maintenance as far as the relative position between the liquid crystal panel and the lens is concerned.

The present invention adopts the following means to solve the above-mentioned problems. A goggle type display device in accordance with the present invention is constituted by a voice-reproducing device, a self-luminous EL panel of a display unit, an optical element constituted by a prism, a lens, a mirror and the like for enlarging a displayed image and for introducing it to the user's eyes, and a driving device for controlling the voice-reproducing device and the display unit. The EL panel is also called an organic EL display (OELD) or an organic light emitting diode (OLED). The use of the self-luminous EL panel makes it possible to provide the user with an image of a high degree of luminance without using a backlight in contrast to the liquid crystal panel. Also, no use of the backlight enables power consumption to be reduced.

In the case where the display device uses a liquid crystal panel, it is required to have a member for fixing the optical element, the liquid crystal panel, and the backlight such that these three members are not misaligned in the relative position. In the case where the display device uses the EL panel, it is required to fix only the optical element and the EL panel such that they are not misaligned, which results in preventing the occurrence of a misalignment between them and in reducing the weight of a fixing member by the weight of the backlight as compared with the display device using the liquid crystal panel.

Further, since the EL panel is not required to use a polarizing plate in contrast with the liquid crystal panel, it can prevent luminance from being reduced by the use of the polarizing plate.

In this connection, the goggle type display device is not necessarily provided with the voice-reproducing device.

According to the first aspect of the present invention, a goggle type display device comprises a display unit and an optical element, wherein said display unit is integral with said optical element.

According to a second aspect of the present invention, a goggle type display device comprises a display unit and a lens for enlarging an image displayed by said display unit, wherein said display unit is integral with said lens.

According to the third aspect of the present invention, a goggle type display device comprises a display unit and a lens for enlarging an image displayed by said display unit, wherein said display unit is built in a part of said lens.

According to the fourth aspect of the present invention, a goggle type display device comprises a display unit and an optical element, wherein said display unit is integrally formed with said optical element.

According to the fifth aspect of the present invention, a goggle type display device comprises a display unit and a lens for enlarging an image displayed by said display unit, wherein said display unit is integrally formed with said lens.

According to the sixth aspect of the present invention, a goggle type display device comprises a display unit for receiving an image signal and for displaying an image and an optical element, wherein said display unit is constituted by an EL element.

According to the seventh aspect of the present invention, a goggle type display device comprises a display unit for receiving an image signal and for displaying an image and a lens for enlarging said image displayed by said display unit, wherein said display unit is constituted by an EL element.

According to the eighth aspect of the present invention, a goggle type display device for both eyes comprises two sets of display units for receiving an image signal and for displaying an image and two sets of optical elements, wherein each of the display units is constituted by an EL element.

According to the ninth aspect of the present invention, a goggle type display device for both eyes comprises two sets of display units for receiving an image signal and for displaying an image and two sets of lenses for enlarging said image displayed by said display unit, wherein each of said display units is constituted by an EL element.

According to the tenth aspect of the present invention, a goggle type display device for a single eye comprises a set of display unit for receiving an image signal and for displaying an image and a set of optical element, wherein said display unit is constituted by an EL element.

According to the eleventh aspect of the present invention, a goggle type display device for a single eye comprises a set of display unit for receiving an image signal and for displaying an image and a set of lens for enlarging said image displayed by said display unit, wherein said display unit is constituted by an EL element.

BRIEF DESCRIPTION OF THE DRAWINGS

FIG. 1 is an illustration showing the constitution of an optical element, a display element and the like of a goggle type display device in accordance with the present invention.

FIG. 2 is a schematic constitutional illustration of a preferred embodiment of a goggle type display device in accordance with the present invention.

FIG. 3 is a cross-sectional view of a preferred embodiment of a goggle type display device in accordance with the present invention.

FIG. 4 is a schematic block diagram of a liquid crystal panel of a preferred embodiment of a goggle type display device in accordance with the present invention.

FIGS. 22A to 22D are an example of a manufacturing process of a liquid crystal panel used in a goggle type display device in accordance with the present invention.

FIGS. 23A to 23D are an example of a manufacturing process of a liquid crystal panel used in a goggle type display device in accordance with the present invention.

FIGS. 25A to 25C are an example of a manufacturing process of a liquid crystal panel used in a goggle type display device in accordance with the present invention.

FIG. 45 is a constitution of an optical element and a display unit in the case where a liquid crystal panel is used.

DESCRIPTION OF REFERENCE NUMERALS

Figure 5:
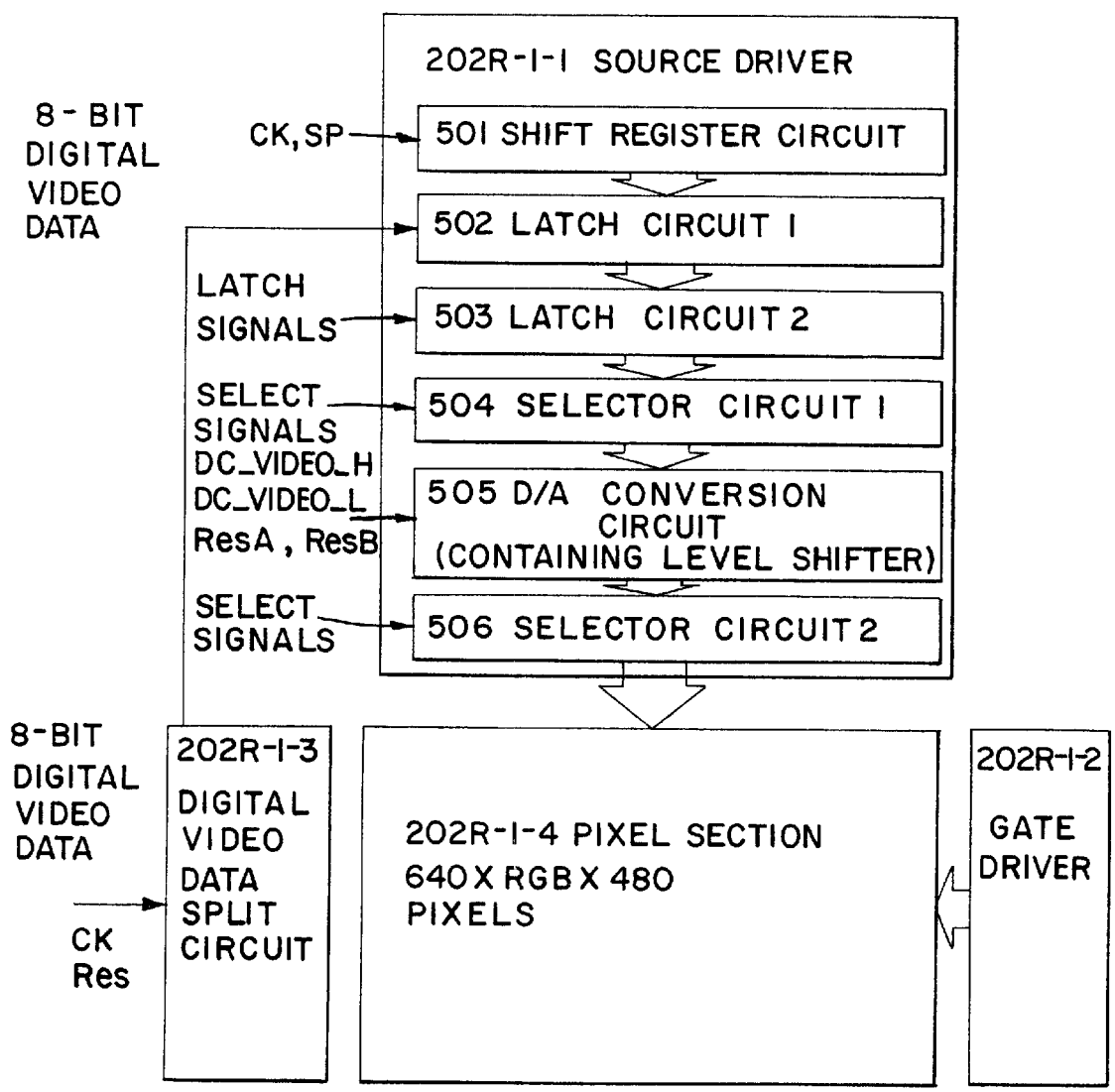
FIG. 5 is a schematic block diagram of a liquid crystal panel of a preferred embodiment of a goggle type display device in accordance with the present invention.

101 . . . lens, 102 . . . liquid crystal panel, 103 . . . backlight, 104 . . . user's eyeball

DESCRIPTION OF THE PREFERRED EMBODIMENTS

A goggle type display device in accordance with the present invention will hereinafter be described in detail based on preferred embodiments. In this connection, it is not intended to limit the goggle type display device in accordance with the present invention to the preferred embodiments described below.

Preferred Embodiment 1

Referring now to FIG. 2, in FIG. 2 is shown a schematic constitutional illustration of a goggle type display device of the present preferred embodiment which includes a goggle type display device body 200, lenses 201R and 201L, liquid crystal panels 202R and 202L, and backlights 203R and 203L.

FIG. 3 is a cross-sectional view of an A portion in FIG. 2 of the goggle type display device of the present preferred embodiment. As is shown in FIG. 2 and FIG. 3, in the present preferred embodiment, the liquid crystal panel 202R is fitted in the groove of the lens 201R. In this connection, the liquid crystal panel 202R may be provided with a pair of polarizing plates or a single polarizing plate, although not shown. Also, sometimes, a combination of the liquid crystal panel 202R and the polarizing plate are also called a liquid crystal panel. In this connection, the liquid crystal panel 202R is built in the groove in the lens 201R.

Referring now to FIG. 4, the outline of the liquid crystal panel 202R of the present preferred embodiment will be described. In this respect, the liquid crystal panel 202L also has the same structure as the liquid crystal panel 202R.

A reference numeral 202R designates a liquid crystal panel having a digital driver. The liquid crystal panel 202R has an active matrix substrate 202R-1 and an opposite substrate 202R-2 (not shown). The active matrix substrate 202R-1 has a source driver 202R-1-1, a gate driver 202R-1-2, a digital video data split circuit 202R-1-3, and a pixel part 202R-1-4 in which a plurality of pixel TFTs are arranged in a matrix. The source driver 202R-1-1 and the gate driver 202R-1-2 drive the plurality of pixel TFTs of the pixel part. Also, the opposite substrate 202R-2 has an opposite electrode 202R-2-1 (not shown). Reference characters 202R-1-5 and 202R-1-6 designate FPC terminals to which various kinds of signals are applied from external parts.

Referring next to FIG. 5, FIG. 5 is a schematic constitutional illustration of the source driver of the liquid crystal panel of the present preferred embodiment which is illustrated particularly in detail. A reference character 202R-1-1 designates a source driver, a reference character 202R-1-2 designates a gate driver, a reference character 202R-1-4 designates a pixel part, and a reference character 202R-1-3 designates a digital video data split circuit.

The source driver 202R-1-1 has a shift register circuit (shift register circuit including 240 stages×2) 501, a latch circuit 1 (including 960×8 digital latch circuits) 502, a latch circuit 2 (including 960×8 digital latch circuits) 503, a selector circuit 1 (including 240 selector circuits) 504, a D/A conversion circuit (including 240 DACs) 505, a selector circuit 2 (including 240 selector circuits) 506, and others such as a buffer circuit and a level shifter circuit (both not shown). For convenience in description, the D/A conversion circuit 505 includes the level shifter circuit.

The reference character 202R-1-2 designates a gate driver which includes the shift register circuit, the buffer circuit, the level shifter circuit, and the like (any of them not shown).

The pixel part 202R-1-4 has (640×RGB)×1080 (columns×rows) pixels. Each pixel has a pixel TFT and a source signal line is electrically connected to the source region of the each pixel TFT and a gate signal line is electrically connected to the gate electrode of each pixel TFT. Also, a pixel electrode is electrically connected to the drain region of each pixel TFT. Each pixel TFT controls the supply of an image signal (gradation voltage) to the pixel electrode electrically connected to each pixel TFT. The image signal (gradation voltage) is supplied to each pixel electrode to apply the voltage to a liquid crystal sandwiched between each pixel electrode and the opposite electrode to drive the liquid crystal.

Here, the action and the flow of the signal of the active matrix type liquid crystal panel of the present preferred embodiment will be described.

First, the action of the source driver will be described. A clock signal (CK) and a start pulse (SP) are applied to the shift register circuit 501. The shift register circuit 501 produces timing signals in sequence on the basis of the clock signal (CK) and the start pulse (SP) to supply the timing signals in sequence to the following circuit through a buffer circuit or the like (not shown).

The timing signal from the shift register 501 is buffered by the buffer circuit or the like. The source signal line to which the timing signal is supplied has a large load capacitance (parasitic capacitance) because it has many circuits or elements connected thereto. The buffer circuit is provided to prevent the dull leading edge of the timing signal from being produced by the large load capacitance.

The timing signal buffered by the buffer circuit is supplied to the latch circuit 1 (502). The latch circuit 1 (502) has the 960 stages of latch circuits for processing 8-bit digital video data. When the timing signal is applied to the latch circuit 1 (502), the latch circuit 1 (502) sequentially takes in and holds the 8-bit digital video data supplied by the digital video data split circuit 202R-1-3.

The time that elapses before the digital video data is written into all stages of the latch circuits of the latch circuit 1 (502) is called a line period: that is to say, the line period is the time interval between the start of writing the digital video data into the left end stage of the latch circuits of the latch circuit 1 (502) and the end of writing the digital video data into the right end stage of the latch circuits thereof. In reality, a period of the above-mentioned line period plus a horizontal retrace period is sometimes called a line period.

After one line period, a latch signal is supplied to the latch circuit 2 (503) in accordance with the action timing of the shift register circuit 501. At this instant, the digital video data written into and held by the latch circuit 1 (502) is sent out in unison to the latch circuit 2 (503) and is written into and held by all stages of latch circuits of the latch circuit 2 (503).

Into the latch circuit 1 (502) having finished sending out the digital video data to the latch circuit 2 (503) is again sequentially written the digital video data supplied by the digital video data split circuit on the basis of the timing signal from the shift register circuit 501.

During the second line period, the digital video data written into and held by the latch circuit 2 (503) is selected in sequence by the selector circuit 1 (504) and is supplied to the D/A conversion circuit 505. In this preferred embodiment, one selector circuit corresponds to four source signal lines in the selector circuit 1 (504).

In this connection, a selector circuit disclosed in Japanese Patent Application No. 9-286098 of the present applicant can be also used as the above-mentioned selector circuit.

The 8-bit digital video data from the latch circuit 2 (503) selected by the selector circuit 504 is supplied to the D/A conversion circuit 505. Here, the D/A conversion circuit used in the present preferred embodiment will be described by the use of FIG. 7.

Figure 7:
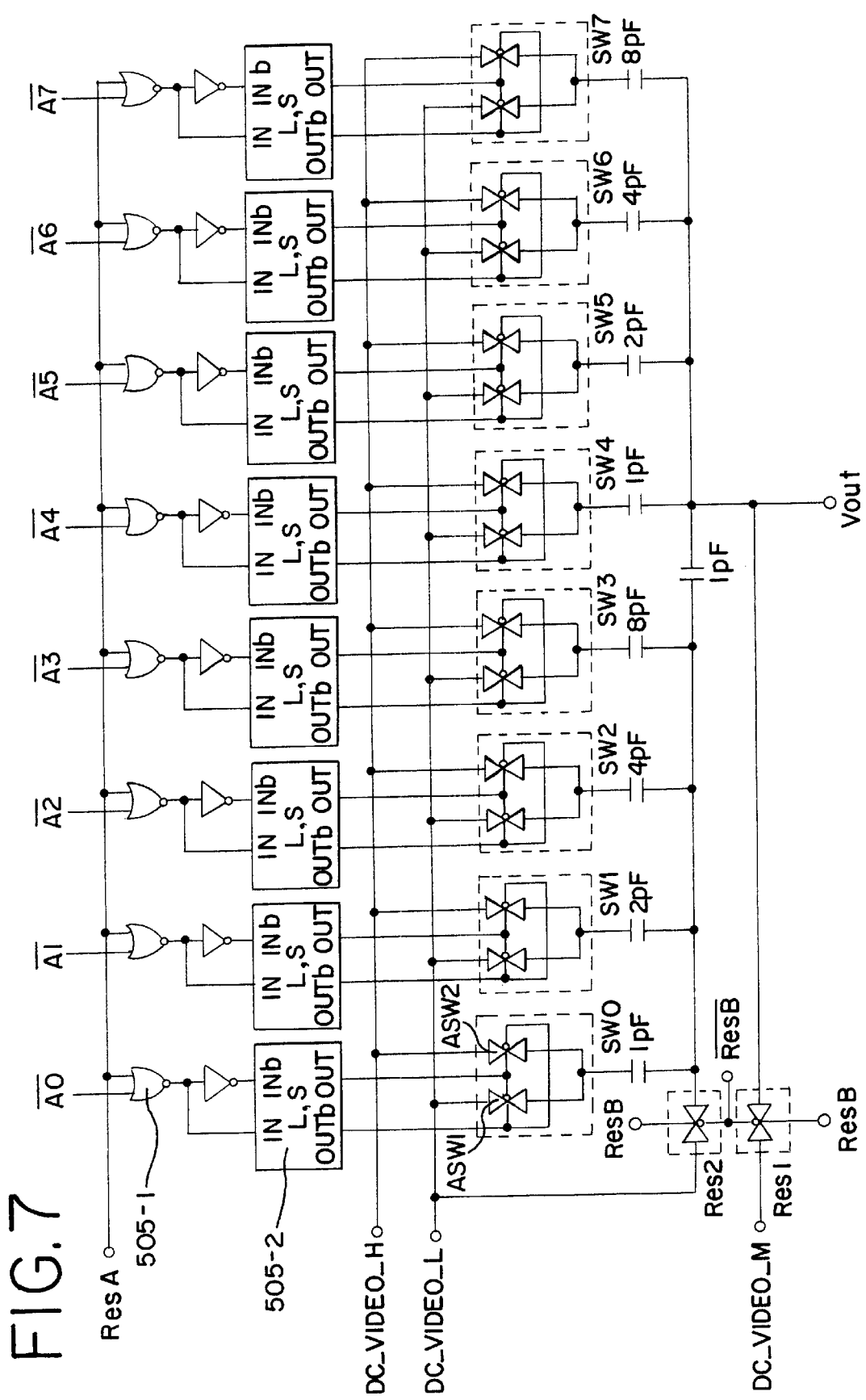
FIG. 7 is a circuit diagram of a D/A converter circuit of a preferred embodiment of a goggle type display device in accordance with the present invention.

In FIG. 7 is shown a circuit diagram of the D/A conversion circuit of the present preferred embodiment. In this connection, the D/A conversion circuit of the present preferred embodiment has the level shifter circuits (L.S) 505-2, but it is also possible to design a D/A conversion circuit having no level shifter circuit. The level shifter circuit is designed in such a way that when a signal Lo is applied to an input IN and a signal Hi is applied to an input INb, a high-electric-potential power source VddHI is put out from an output OUT and a low-electric-potential power source Vss is put out from an output OUTb. Also, it is designed in such a way that when the signal Hi is applied to the input IN and the signal Lo is applied to the input INb, a high-electric-potential power source Vss is put out from the output OUT and a low-electric-potential power source VddHI is put out from the output OUTb.

The D/A conversion circuit of the present preferred embodiment is designed in such a way that the reverse data of digital video data from A0 to A7 (here referred to as reverse data A0 to A7) is applied to one input of each NOR circuit (505-1). To the other input of the NOR circuit (505-1) is applied a reset pulse A (ResA). This reset pulse A is applied in the reset period TR of the D/A conversion circuit. In the case of the present preferred embodiment, the digital video data (reverse data from A0 to A7) is applied to the NOR circuit (505-1) even in the reset period TR but while the reset pulse ResA is being applied to the NOR circuit (505-1), the digital video data is not put out from the NOR circuit (505-1).

In this connection, it is also recommended that the NOR circuit (505-1) be omitted and that the digital video data (reverse data from A0 to A7) be applied thereto after the reset period TR is finished.

After the reset period TR is finished, a data writing period TE starts and the voltage level of the 8-bit digital video data is increased by the level shifter circuit and the 8-bit digital video data is applied to the switch circuits from SW0 to SW7.

Each of the switch circuits from SW0 to SW7 is constituted by two analog switches ASW1 and ASW2. One terminal of the ASW1 is connected to a DC-VIDEO-L and the other terminal thereof is connected to one terminal of the ASW2 and to a capacitance. Also, one terminal of each ASW2 is connected to a DC-VIDEO-H and the other terminal thereof is connected to one terminal of the ASW2 and to one of capacitances (1 pF, 2 pF, 4 pF, 8 pF, 1 pF, 2 pF, 4 pF, 8 pF). One terminal of the capacitance is connected to two analog switches and the other terminal is connected to a reset switch 2 (Res 2). Also, one terminal of the reset switch 1 (Res 1) is connected to a DC-VIDEO-M and the other terminal thereof is connected to one terminal of the capacitance corresponding to higher bits. To the reset switches Res 1 and Res 2 are entered a reset pulse (Res B) and a reverse reset pulse (reverse Res B).

Also, a capacitance (1 pF) is provide data connection point of a circuit corresponding to higher bits and a circuit corresponding to lower bits. In this connection, the above-mentioned capacitance in the present preferred embodiment is not limited to the value.

The D/A conversion circuit 505 converts the 8-bit digital video data to an image signal (gradation voltage) and supplies the image signal in sequence to the source signal line selected by the selector circuit 2 (506).

The image signal supplied to the source signal line is supplied to the source region of the pixel TFT of the pixel part connected to the source signal line.

In the gate driver 202R-1-2, the timing signal (scanning signal) from the shift register (not shown) is supplied to the buffer circuit (not shown) and is supplied to the gate signal line (scanning line). To the gate signal line is connected the gate electrodes of the pixel TFTs of one line and the buffer circuit has a large current capacity because all the pixel TFTs of one line need to be turned on at the same time.

In this way, the scanning signal from the gate driver switches the pixel TFT corresponding thereto to supply the image signal (gradation voltage) from the source driver to the pixel TFT to drive a liquid crystal molecule.

A reference character 202R-1-3 designates a digital video data split circuit (SPC; Serial-to-Parallel Conversion Circuit). The digital video data split circuit 202R-1-3 is a circuit for converting the frequency of digital video data entered from outside to 1/x (x: a natural integer of two or more). The frequency of a signal necessary for the action of a driving circuit is also converted to 1/x by splitting the digital video data entered from outside.

Figure 6:
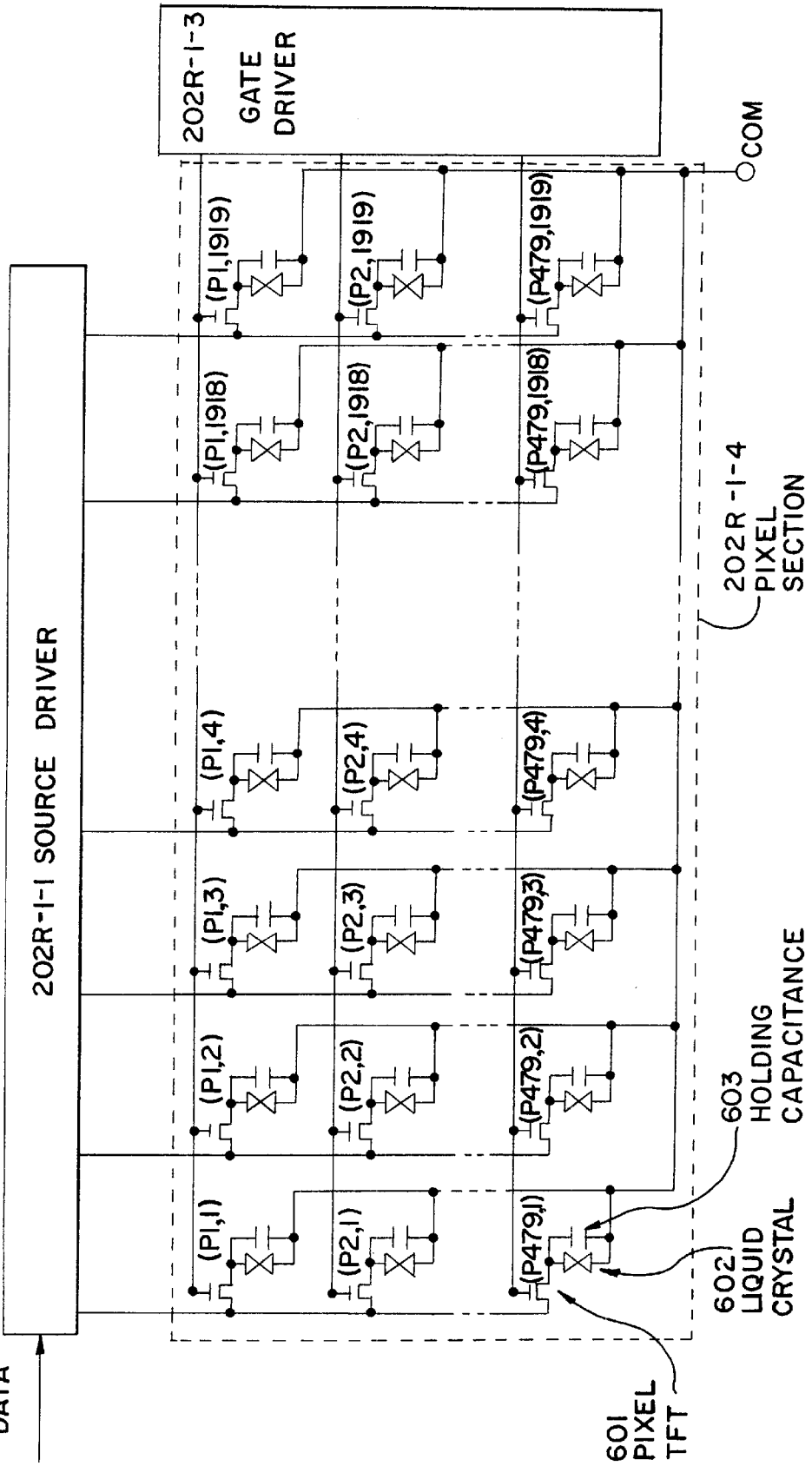
FIG. 6 is a circuit diagram of a liquid crystal panel of a preferred embodiment of a goggle type display device in accordance with the present invention.

Here, the circuit constitution of the liquid crystal panel 202R of the liquid crystal panel of the present preferred embodiment, in particular, the constitution of the pixel part 202R-1-4 will be described with reference to FIG. 6.

In the present preferred embodiment, the pixel part 202R-1-4 has (640×RGB×480) pixels. To the pixels are attached marks P1, 1, P2,1, . . . , P1079, 1919. Also, each pixel has a pixel TFT 601 and a holding capacitance 603. Also, a liquid crystal 602 is sandwiched between the active matrix substrate and the opposite substrate and the liquid crystal 602 schematically shows a liquid crystal corresponding to each pixel. In this connection, a COM designates a common voltage terminal and is connected to the one terminal of each opposite electrode and to the one terminal of each holding capacitance.

The liquid crystal panel of the present preferred embodiment drives the pixels of one line (for example, P1,1, P1,2, . . . , P1,1919) at the same time, in other word, writes the image signal into all the pixels of one line at the same time.

Preferred Embodiment 2

Figure 8:
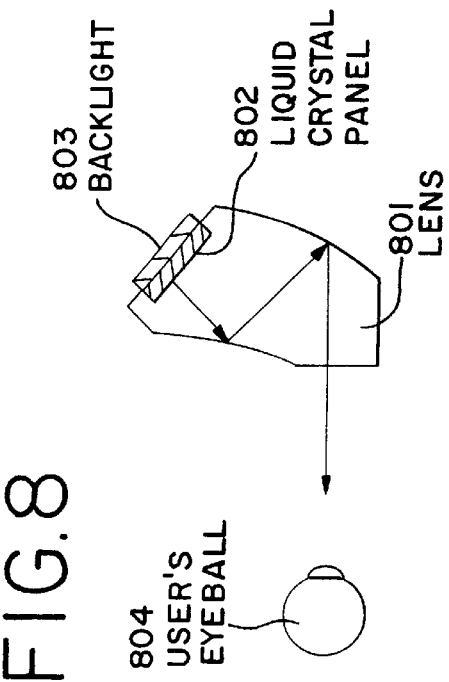
FIG. 8 is a schematic constitutional illustration of a preferred embodiment of a goggle type display device in accordance with the present invention.

Referring now to FIG. 8, in FIG. 8 are shown a lens, a liquid crystal panel of an image display part and a backlight which are used in the goggle type display device of the present preferred embodiment. In the present preferred embodiment, the shape of the lens is different from that of the preferred embodiment 1. In the present preferred embodiment, the liquid crystal panel is fixed to the lens and hence the liquid crystal panel is not shifted in the relative position from the lens.

In FIG. 8, a reference number 801 designates a lens, a reference number 802 designates a liquid crystal panel, a reference number 803 designates a backlight and a reference number 804 designates a user's eyeball. In the lens 801 is previously made a groove to which the liquid crystal panel is fixed and the liquid crystal panel 802 is built in the groove.

In this connection, the backlight 803 may be fixed to the liquid crystal panel 802 or the lens 801.

Figure 9:
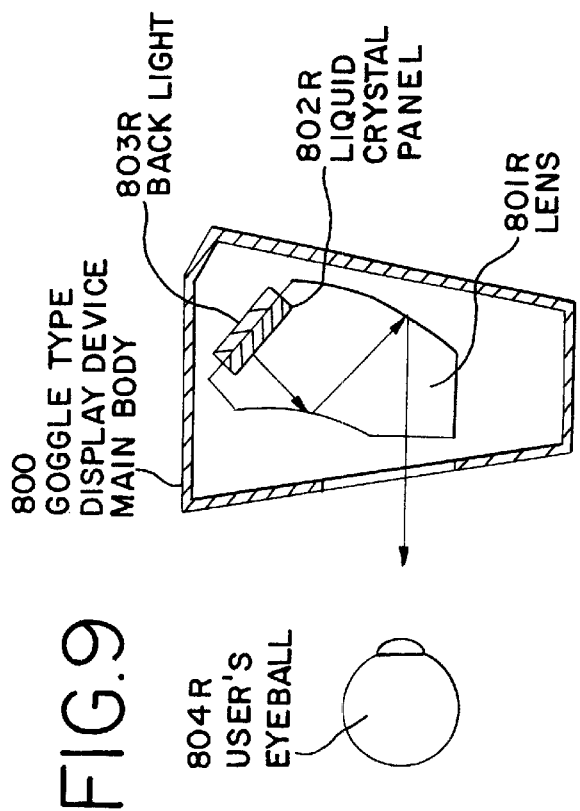
FIG. 9 is a schematic constitutional illustration of a preferred embodiment of a goggle type display device in accordance with the present invention.

In FIG. 9 is shown a cross-sectional view of the goggle type display device of the present preferred embodiment. In the present preferred embodiment, in the groove of the lens 801R is built a liquid crystal panel 802R. In this connection, the liquid crystal panel 802R may be provided with a pair of polarizing plate or a single polarizing plate, though not shown in FIG. 9. Also, a combination of the liquid crystal panel 802R and the polarizing plate is sometimes called a liquid crystal panel.

Preferred Embodiment 3

Figure 10:
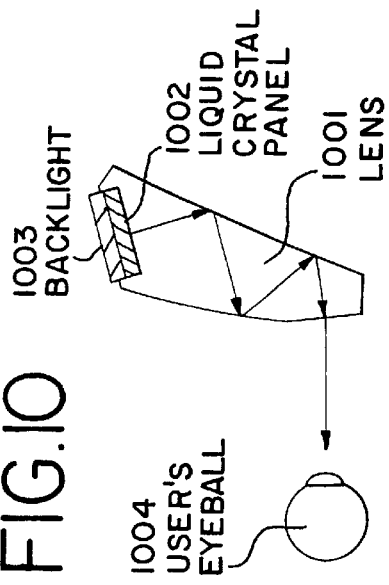
FIG. 10 is a schematic constitutional illustration of a preferred embodiment of a goggle type display device in accordance with the present invention.

Referring now to FIG. 10, in FIG. 10 are shown a lens, a liquid crystal panel of an image display part and a backlight which are used in the goggle type display device of the present preferred embodiment. In the present preferred embodiment, the shape of the lens is different from that of the preferred embodiment 1 or that of the preferred embodiment 2. In the present preferred embodiment, the liquid crystal panel is fixed to the lens and hence the liquid crystal panel is not shifted in the relative position from the lens.

In FIG. 10, a reference number 1001 designates a lens, a reference number 1002 designates a liquid crystal panel, a reference number 1003 designates a backlight and a reference number 1004 designates a user's eyeball. In the lens 1001 is previously made a groove to which the liquid crystal panel is fixed and the liquid crystal panel 1002 is built in the groove.

In this connection, the backlight 1003 may be fixed to the liquid crystal panel 1002 or the lens 1001.

Figure 11:
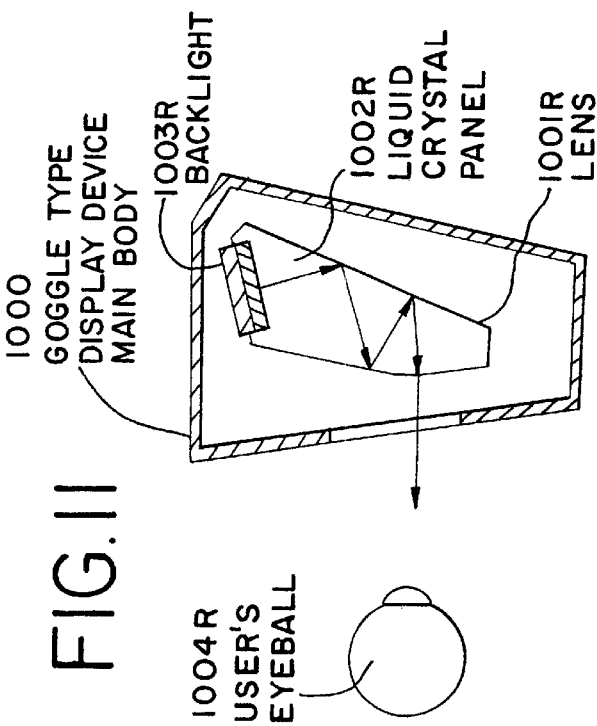
FIG. 11 is a schematic constitutional illustration of a preferred embodiment of a goggle type display device in accordance with the present invention.

In FIG. 11 is shown a cross-sectional view of the goggle type display device of the present preferred embodiment. In the present preferred embodiment, in the groove of the lens 1001R is built a liquid crystal panel 1002R. In this connection, the liquid crystal panel 1002R may be provided with a pair of polarizing plate or a single polarizing plate, though not shown in FIG. 11. Also, a combination of the liquid crystal panel 1002R and the polarizing plate is sometimes called a liquid crystal panel.

Preferred Embodiment 4

Figure 12:
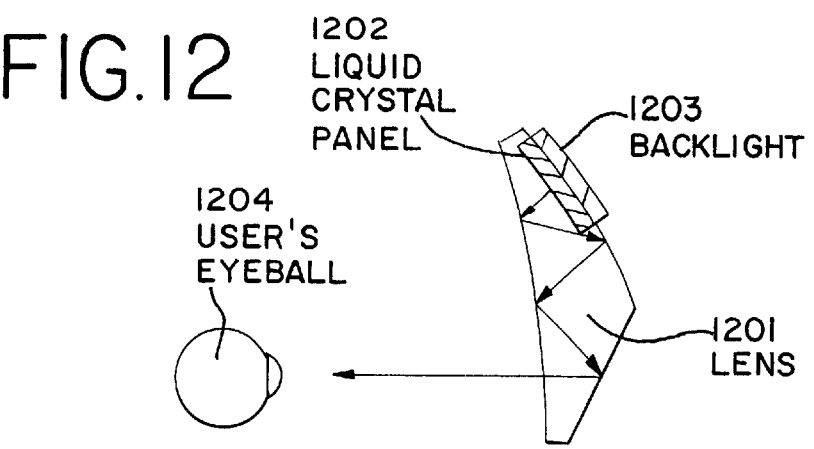
FIG. 12 is a schematic constitutional illustration of a preferred embodiment of a goggle type display device in accordance with the present invention.

Referring now to FIG. 12, in FIG. 12 are shown a lens, a liquid crystal panel of an image display part and a backlight which are used in the goggle type display device of the present preferred embodiment. In the present preferred embodiment, the shape of the lens is different from that of the preferred embodiment 1, that of the preferred embodiment 2, or that of the preferred embodiment 3. In the present preferred embodiment, the liquid crystal panel is fixed to the lens and hence the liquid crystal panel is not shifted in the relative position from the lens.

In FIG. 12, a reference number 1201 designates a lens, a reference number 1202 designates a liquid crystal panel, a reference number 1203 designates a backlight and a reference number 1204 designates a user's eyeball. In the lens 1201 is previously made a groove to which the liquid crystal panel is fixed and the liquid crystal panel 1202 is built in the groove.

In this connection, the backlight 1203 may be fixed to the liquid crystal panel 1202 or the lens 1201.

Figure 13:
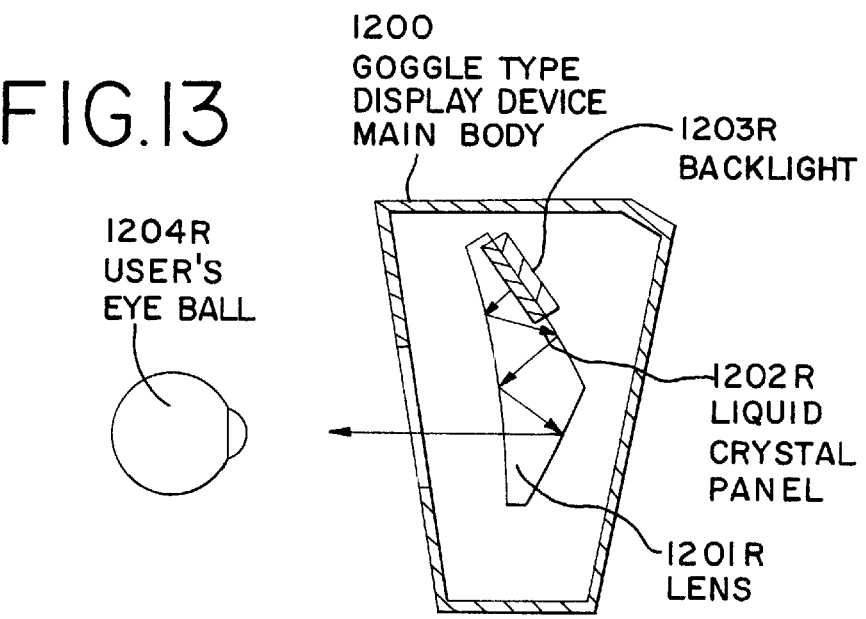
FIG. 13 is a schematic constitutional illustration of a preferred embodiment of a goggle type display device in accordance with the present invention.

In FIG. 13 is shown a cross-sectional view of the goggle type display device of the present preferred embodiment. In the present preferred embodiment, in the groove of the lens 1201R is built a liquid crystal panel 1202R. In this connection, the liquid crystal panel 1202R may be provided with a pair of polarizing plate or a single polarizing plate, though not shown in FIG. 12.

Preferred Embodiment 5

Figure 14:
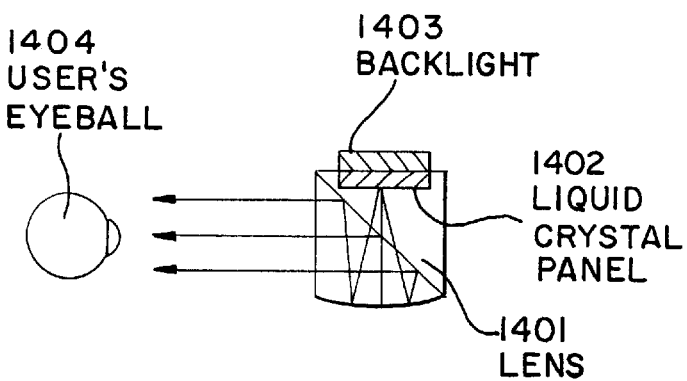
FIG. 14 is a schematic constitutional illustration of a preferred embodiment of a goggle type display device in accordance with the present invention.

Referring now to FIG. 14, in FIG. 14 are shown a lens, a liquid crystal panel of an image display part and a backlight which are used in the goggle type display device of the present preferred embodiment. In the present preferred embodiment, the shape of the lens is different from those of the preferred embodiments 1, 2, 3, 4. In the present preferred embodiment, the liquid crystal panel is fixed to the lens and hence the liquid crystal panel is not shifted in the relative position from the lens.

In FIG. 14, a reference number 1401 designates a lens, a reference number 1402 designates a liquid crystal panel, a reference number 1403 designates a backlight and a reference number 1404 designates a user's eyeball. In the lens 1401 is previously made a groove to which the liquid crystal panel is fixed and the liquid crystal panel 1402 is built in the groove.

In this connection, the backlight 1403 may be fixed to the liquid crystal panel 1402 or the lens 1401.

Figure 15:
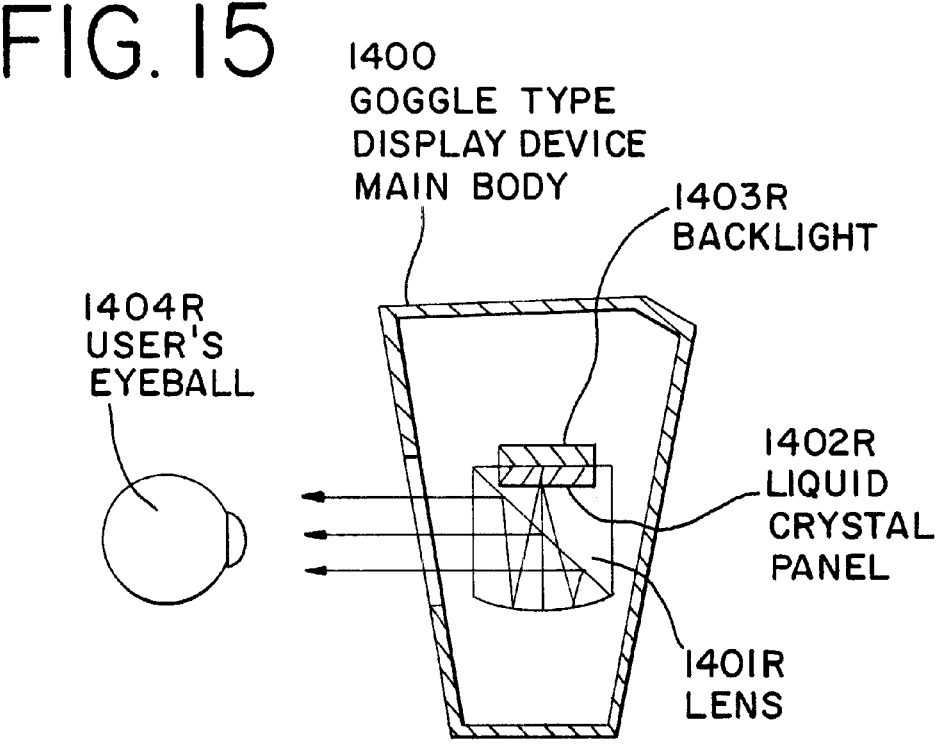
FIG. 15 is a schematic constitutional illustration of a preferred embodiment of a goggle type display device in accordance with the present invention.

In FIG. 15 is shown a cross-sectional view of the goggle type display device of the present preferred embodiment. In the present preferred embodiment, in the groove of the lens 1401R is built a liquid crystal panel 1402R. In this connection, the liquid crystal panel 1402R may be provided with a pair of polarizing plate or a single polarizing plate, though not shown in FIG. 15.

Preferred Embodiment 6

Figure 16:
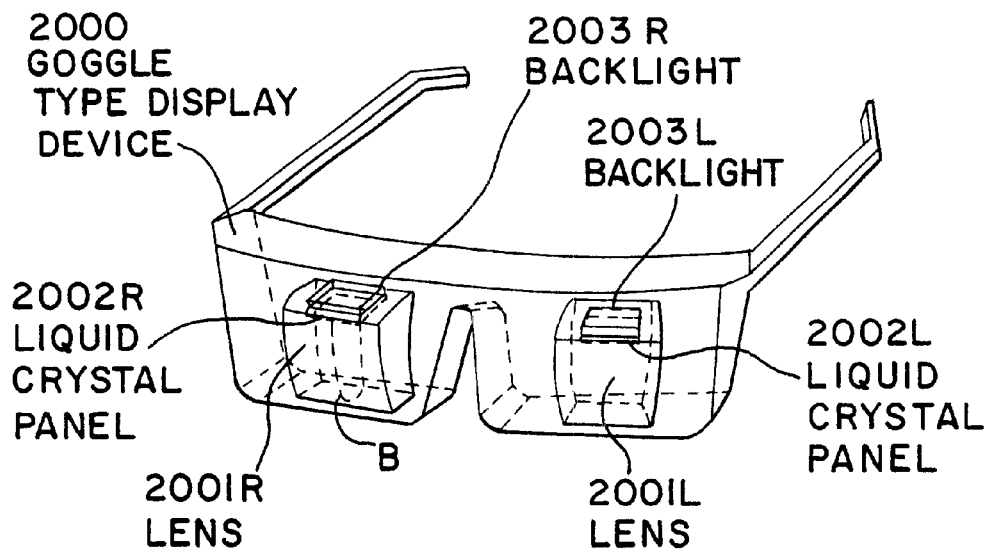
FIG. 16 is a schematic constitutional illustration of a preferred embodiment of a goggle type display device in accordance with the present invention.

Referring now to FIG. 16, in FIG. 16 is shown a schematic constitutional illustration of the goggle type display device of the present preferred embodiment. In FIG. 16, a reference number 2000 designates a goggle type display device body, reference characters 2001R and 2001L designate lenses, reference characters 2002R and 2002L designate liquid crystal panels, and reference characters 2003R and 2003L designate backlights.

Figure 17:
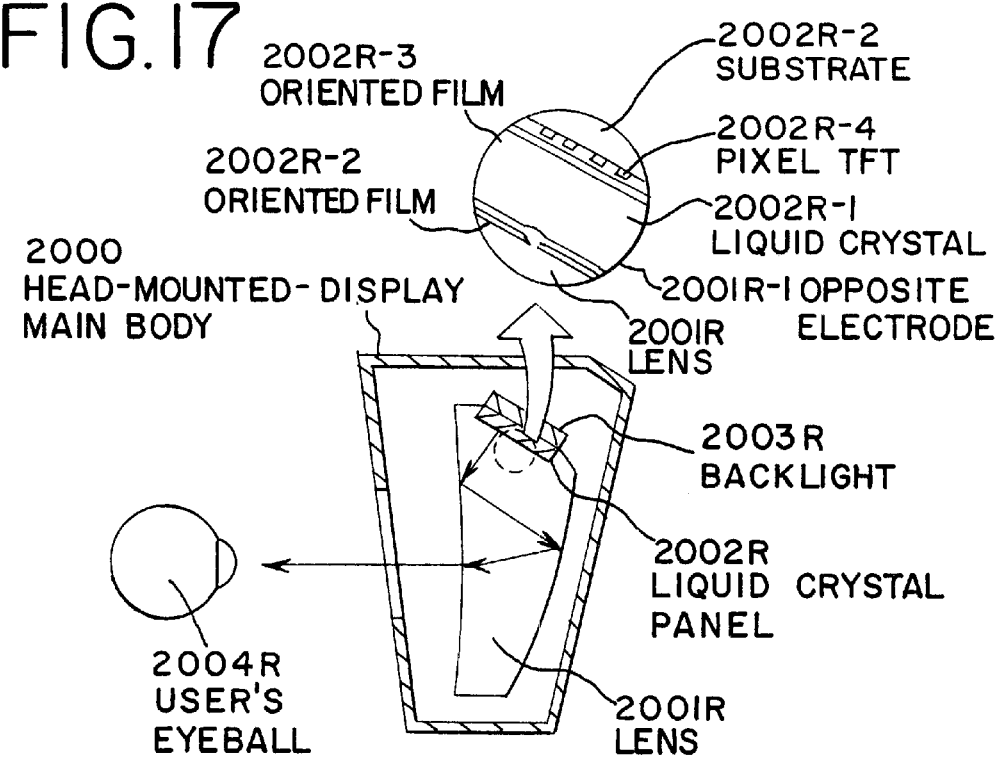
FIG. 17 is a schematic constitutional illustration of a preferred embodiment of a goggle type display device in accordance with the present invention.

In FIG. 17 is shown a cross-sectional view of a part B in FIG. 16 of the goggle type display device of the present preferred embodiment. In the present preferred embodiment, the groove of the lens 2001R is integrally formed with the liquid crystal panel 2002R. In FIG. 17 is shown an enlarged view of the boundary portion between the groove of the lens 2001R and the liquid crystal panel 2002R: that is to say, a part of the lens 2001R functions as the opposite substrate of the liquid crystal panel 2002R.

A reference character 2001R-1 designates an opposite electrode, a reference character 2001R-2 designates an oriented film and both of them are formed at the lens 2001R side. A reference character 2002R-1 designates a liquid crystal, a reference character 2002R-2 designates a substrate, a reference character 2002R-4 designates a pixel TFT formed on the substrate, and a reference character 2002R-3 designates an oriented film formed on the substrate. In this connection, a polarizing plate is not provided at the opposite plate side. Some liquid crystal may be provided with a pair of polarizing plates or a single polarizing plate.

Preferred Embodiment 7

Figure 18:
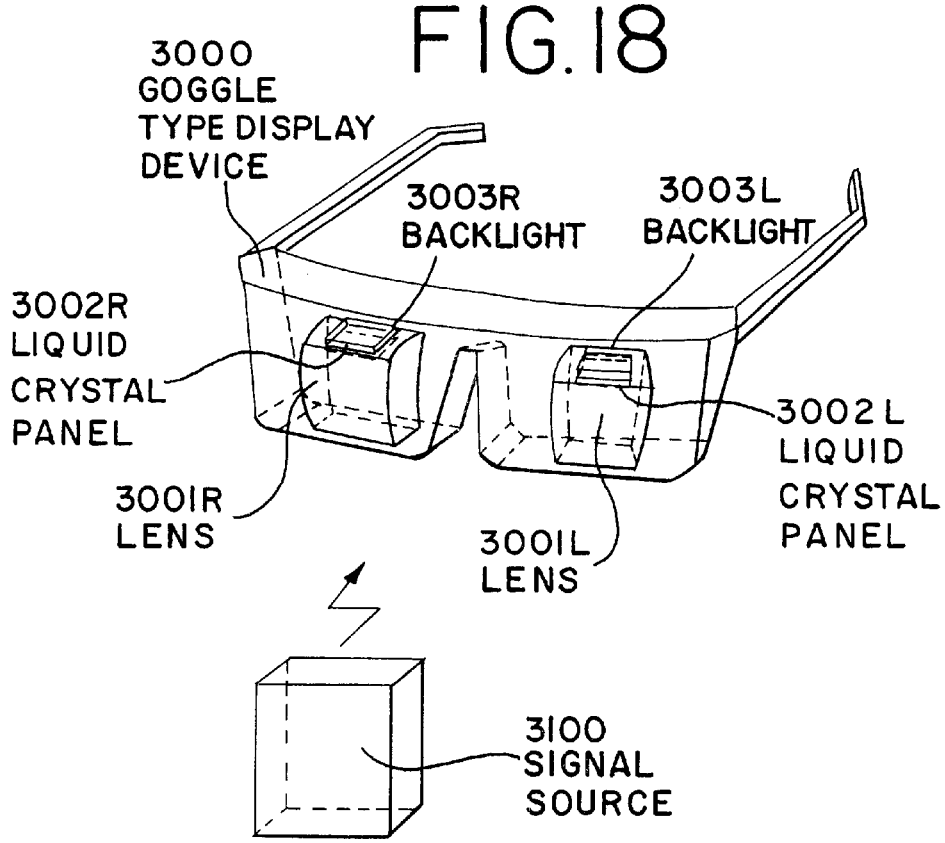
FIG. 18 is a schematic constitutional illustration of a preferred embodiment of a goggle type display device in accordance with the present invention.

Referring now to FIG. 18, in FIG. 18 is shown a schematic constitutional illustration of the goggle type display device of the present preferred embodiment. In FIG. 18, a reference number 3000 designates a goggle type display device body, reference characters 3001R and 3001L designate lenses, reference characters 3002R and 3002L designate liquid crystal panels, and reference characters 3003R and 3003L designate backlights. A reference character 3100 designates a signal source for sending the signal of the image signal or the like as an electromagnetic wave.

Figure 19:
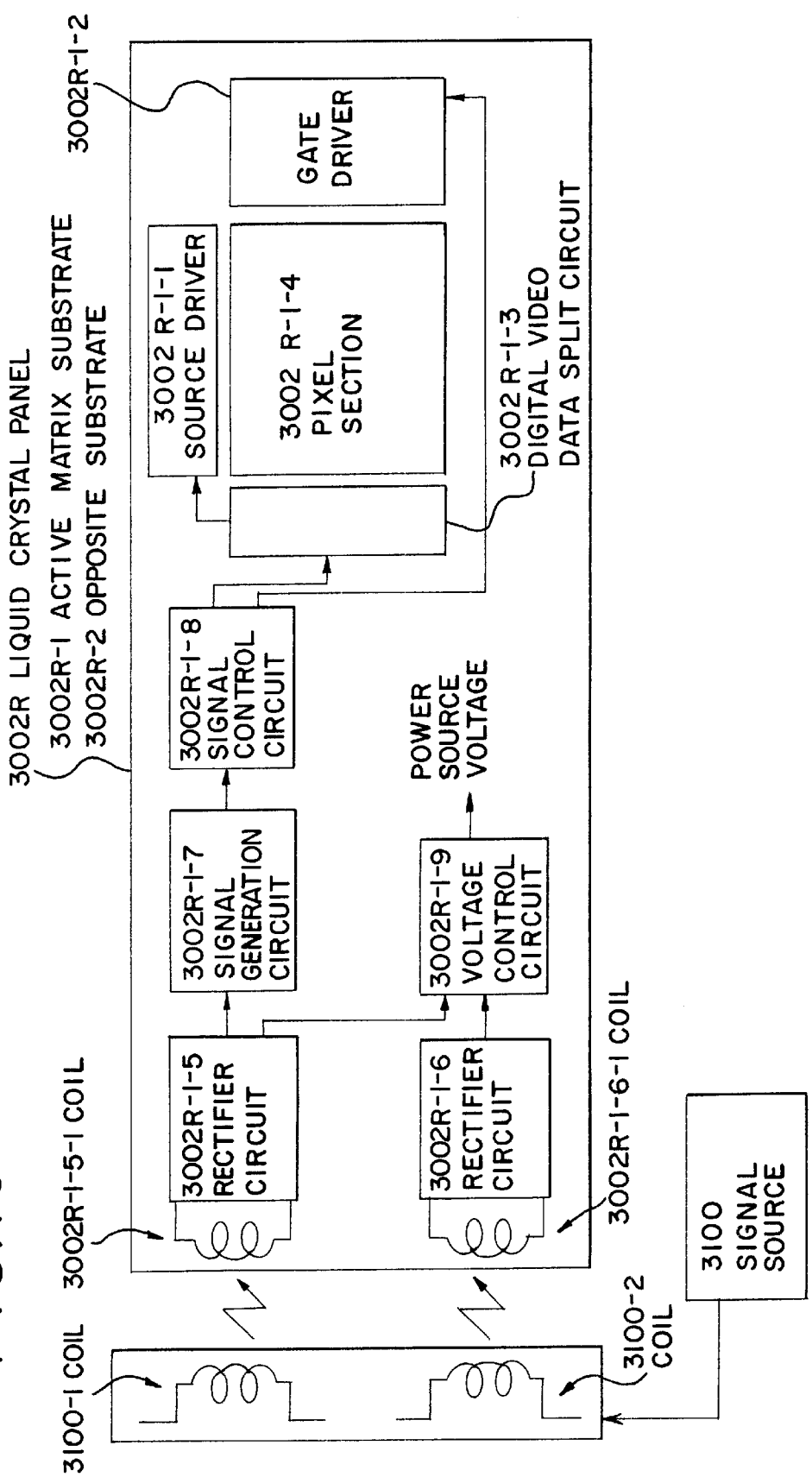
FIG. 19 is a schematic constitutional illustration of a preferred embodiment of a goggle type display device in accordance with the present invention.

In FIG. 19 is shown a schematic block diagram of the liquid crystal panel 3002R and the signal source 3100 of the present preferred embodiment. The liquid crystal panel 3002R has an active matrix substrate 3002R-1 and an opposite substrate 3002R-2 (not shown). The active matrix substrate 3002R-1 has a source driver 3002R-1-1, a gate driver 3002R-1-2, a digital video data split circuit 3002R-1-3, and a pixel part 3002R-1-4 in which a plurality of pixel TFTs are arranged in a matrix. The source driver 3002R-1-1 and the gate driver 3002R-1-2 drive the plurality of pixel TFTs of the pixel part. Also, the opposite substrate 3002R-2 has an opposite electrode 3002R-2-1 (not shown). Reference characters 3002R-1-5 and 3002R-1-6 designate rectifier circuits each of which rectifies a signal received by a coil 3002R-1-5-1 or a coil 3002R-1-6-1. A reference character 3002R-1-7 designates a signal generating circuit which generates a signal such as an image data and the like on the basis of a signal rectified by the rectifier circuit 3002R-1-5 and which puts out the signal to a signal control circuit 3002R-1-8. Also, the signal control circuit 3002R-1-8 puts out the image signal and the like to the digital video data split circuit and the gate driver. A reference character 3002R-1-9 designates a voltage control circuit which generates a power source voltage.

The coils 3100-1 and 3100-2 of the signal source send a signal supplied by the signal source as an electromagnetic wave.

In this connection, it is recommended that each of the rectifier circuit, the signal generating circuit, and the signal control circuit be formed of an IC chip and be fixed to the liquid crystal panel, the lens, or the like.

Preferred Embodiment 8

Figure 20:
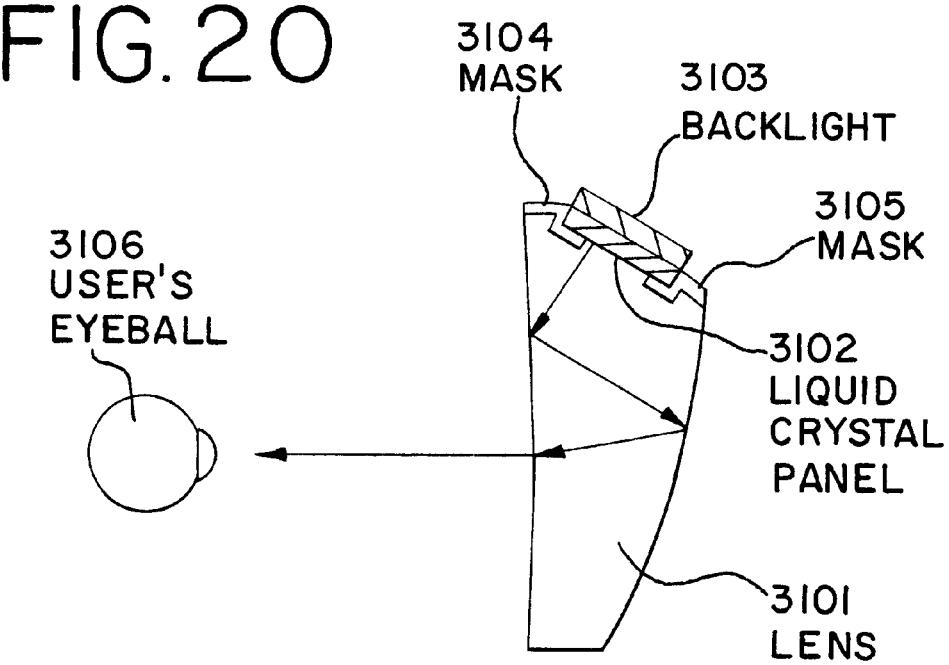
FIG. 20 is a schematic constitutional illustration of a preferred embodiment of a goggle type display device in accordance with the present invention.

In FIG. 20 are shown a lens 3101, a liquid crystal panel 3102, a backlight 3103, and masks 3104 and 3105 of the goggle type display device of the present preferred embodiment, and a user's eyeball 3106. In the lens 3101 is previously made a groove to which the liquid crystal panel 3102 is fixed and the liquid crystal panel 3102 is built in the groove.

In the present preferred embodiment, the masks 3104 and 3105 block light from the part other than the pixel part of the liquid crystal panel and hence can block stray light having no direct bearing on an image.

In this connection, the backlight 3103 may be fixed to the liquid crystal panel or the lens.

Figure 21:
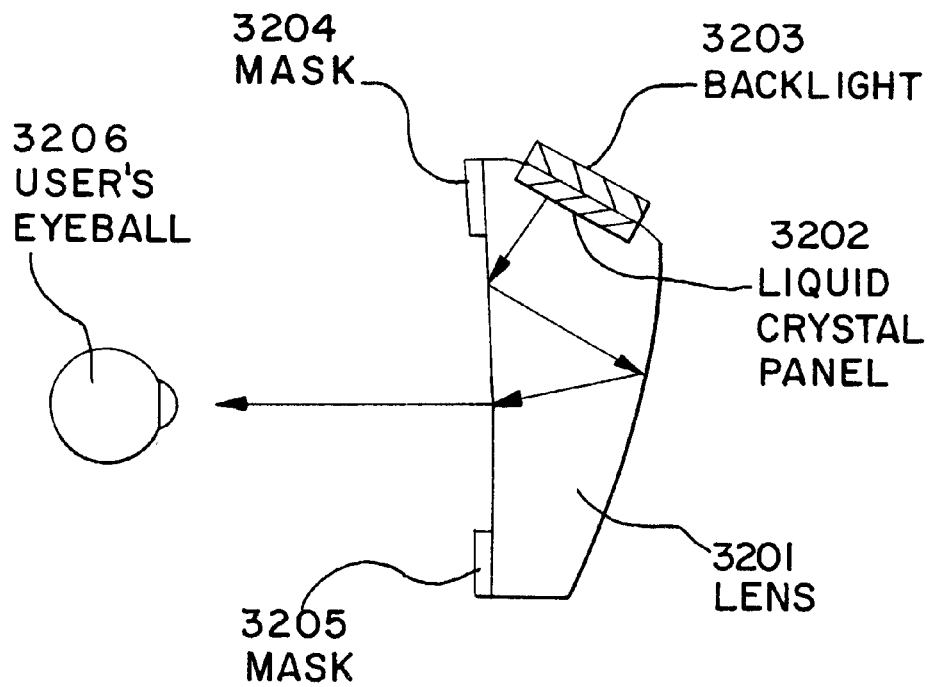
FIG. 21 is a schematic constitutional illustration of a preferred embodiment of a goggle type display device in accordance with the present invention.

Referring now to FIG. 21, in FIG. 21 is shown the goggle type display device of the present preferred embodiment in which the masks 3204 and 3205 are arranged at positions different from those in the above-mentioned embodiments.

Preferred Embodiment 9

Here, the method of fabricating on one and the same substrate pixel TFTs for the pixel section and TFTs of driving circuits (a source driver, a gate driver, a D/A conversion circuit and the like) provided in the periphery of the pixel section will be described in detail in accordance with the fabricating steps. However, in order to simplify the description, CMOS circuits that are the basic circuits of a shift register circuit, a buffer circuit, a D/A conversion circuit and the like and n-channel type TFTs will be shown.

Referring to FIG. 22A, a low-alkaline glass substrate or a quartz substrate can be used as a substrate 6001. In this embodiment, a low-alkaline glass substrate was used. In this case, a heat treatment at a temperature lower by about 10 to 20° C. than the strain point of glass may be performed in advance. On the surface of this substrate 6001 on which TFTs are to be formed, a base film 6002 such as a silicon oxide film, a silicon nitride film or a silicon oxynitride film is formed in order to prevent the diffusion of impurities from the substrate 6001. For example, a silicon oxynitride film which is fabricated from $SiH_4$, $NH_3$, $N_2O$ by, e.g., by plasma CVD and a silicon oxynitride film which is similarly fabricated from $SiH_4$ and $N_2O$ are formed into a laminate, wherein the thickness of both films is 100 nm.

Next, a semiconductor film 6003a that has an amorphous structure and a thickness of 20 to 150 nm (preferably, 30 to 80 nm) is formed by a known method such as plasma CVD or sputtering. In this embodiment, an amorphous silicon film was formed to a thickness of 55 nm by plasma CVD. As semiconductor films which have an amorphous structure, there are an amorphous semiconductor film and a microcrystalline semiconductor film; and a compound semiconductor film with an amorphous structure such as an amorphous silicon germanium film may also be applied. Further, the ground film 6002 and the amorphous silicon film 6003a can be formed by the same deposition method, so that the two films can be formed in succession. By not exposing the base film to the atmospheric air after the formation of the base film, the surface of the base film can be prevented from being contaminated, as a result of which the dispersion in characteristics of the fabricated TFTs and the variation in the threshold voltage thereof can be reduced. (FIG. 22A)

Then, by a known crystallization technique, a crystalline silicon film 6003b is formed from the amorphous silicon film 6003a. For example, a laser crystallization method or a thermal crystallization method (solid phase growth method) may be applied, however, here, in accordance with the technique disclosed in Japanese Patent Laid-Open No. Hei 7-130652, the crystalline silicon film 6003b was formed by the crystallization method using a catalytic element. It is preferred that, prior to the crystallization step, heat treatment is carried out at 400 to 500° C. for about one hour though it depends on the amount of hydrogen contained, so that, after the amount of hydrogen contained is reduced to 5 atomic % or less, the crystallization is carried out. The atoms are subjected to re-configuration to become dense when an amorphous silicon film is crystallized; and therefore, the thickness of the crystalline silicon film fabricated is reduced by about 1 to 15% than the initial thickness of the amorphous silicon film (55 nm in this embodiment). (FIG. 22B)

Then, the crystalline silicon film 6003b is divided into island-shaped portions, whereby island semiconductor layers 6004 to 6007 are formed. Thereafter, a mask layer 6008 of a silicon oxide film is formed to a thickness of 50 to 100 nm by plasma CVD or sputtering. (FIG. 22C)

Then, a resist mask 6009 is provided, and, into the whole surfaces of the island semiconductor layers 6005 to 6007 forming the n-channel type TFTs, boron (B) was added as an impurity element imparting p-type conductivity, at a concentration of about $1 \times 10^{16}$ to $5 \times 10^{17}$ atoms/cm$^3$, for the purpose of controlling the threshold voltage. The addition of boron (B) may be effected either by the ion doping or it may be added simultaneously when the amorphous silicon film is formed. The addition of boron (B) here was not always necessary, however, the formation of semiconductor layers 6010 to 6012 into which boron was added was preferable for maintaining the threshold voltage of the n-channel type TFTs within a prescribed range. (FIG. 22D)

In order to form the LDD regions of the n-channel type TFTs in the driving circuit, an impurity element imparting n-type conductivity is selectively added to the island semiconductor layers 6010 and 6011. For this purpose, resist masks 6013 to 6016 were formed in advance. As the impurity element imparting the n-type conductivity, phosphorus (P) or arsenic (As) may be used; here, in order to add phosphorus (P), ion doping using phosphine (PH$_3$) was applied. The concentration of phosphorus (P) in the impurity regions 6017 and 6018 thus formed may be set within the range of from $2 \times 10^{16}$ to $5 \times 10^{19}$ atoms/cm$^3$. In this specification, the concentration of the impurity element contained in the thus formed impurity regions 6017 to 6019 imparting n-type conductivity is represented by (n$^-$). Further, the impurity region 6019 is a semiconductor layer for forming the storage capacitor of the pixel matrix circuit; into this region, phosphorus (P) was also added at the same concentration. (FIG. 23A)

Next, the mask layer 6008 is removed by hydrofluoric acid or the like, and the step of activating the impurity elements added at the steps shown in FIG. 22D and FIG. 23A is carried out. The activation can be carried out by performing heat treatment in a nitrogen atmosphere at 500 to 600° C. for 1 to 4 hours or by using the laser activation method. Further, both methods may be jointly performed. In this embodiment, the laser activation method was employed, and a KrF excimer laser beam (with a wavelength of 248 nm) was used to form a linear beam; and scan was carried out under the condition that the oscillation frequency was 5 to 50 Hz, the energy density was 100 to 500 mJ/cm$^2$, and the overlap ratio of the linear beam was 80 to 98%, whereby the whole substrate surface on which the island semiconductor layers were formed. Any item of the laser irradiation condition is subjected to no limitation, so that the operator may suitably select the condition.

Then, a gate insulator film 6020 is formed of an insulator film comprising silicon to a thickness of 10 to 150 nm, by plasma CVD or sputtering. For example, a silicon oxynitride film is formed to a thickness of 120 nm. As the gate insulator film, another insulator film comprising silicon may be used as a single layer or a laminate structure. (FIG. 23B)

Next, in order to form a gate electrode, a first conductive layer is deposited. This first conductive layer may be comprised of a single layer but may also be comprised of a laminate consisting of two or three layers. In this embodiment, a conductive layer (A) 6021 comprising a conductive metal nitride film and a conductive layer (B) 6022 comprising a metal film are laminated. The conductive layer (B) 6022 may be formed of an element selected from among tantalum (Ta), titanium (Ti), molybdenum (Mo) and tungsten (W) or an alloy comprised mainly of the above-mentioned element, or an alloy film (typically, an Mo—W alloy film or an Mo—Ta alloy film) comprised of a combination of the above-mentioned elements, while the conductive layer (A) 6021 is formed of a tantalum nitride (TaN) film, a tungsten nitride (WN) film, a titanium nitride (TiN) film, or a molybdenum nitride (MoN) film. Further, as the substitute materials of the conductive film (A) 6021, tungsten silicide, titanium silicide, and molybdenum silicide may also be applied. The conductive layer (B) may preferably have its impurity concentration reduced in order to decrease the resistance thereof; in particular, as for the oxygen concentration, the concentration may be set to 30 ppm or less. For example, tungsten (W) could result in realizing a resistivity of 20 $\mu\Omega$cm or less by rendering the oxygen concentration thereof to 30 ppm or less.

The conductive layer (A) 6021 may be set to 10 to 50 nm (preferably, 20 to 30 nm), and the conductive layer (B) 6022 may be set to 200 to 400 nm (preferably, 250 to 350 nm). In this embodiment, as the conductive layer (A) 6021, a tantalum nitride film with a thickness of 30 nm was used, while, as the conductive layer (B) 6022, a Ta film with a thickness of 350 nm was used, both films being formed by sputtering. In case of performing sputtering here, if a suitable amount of Xe or Kr is added into the sputtering gas Ar, the internal strain of the film formed is alleviated, whereby the film can be prevented from peeling off. Though not shown, it is effective to form a silicon film, into which phosphorus (P) is doped, to a thickness of about 2 to 20 nm underneath the conductive layer (A) 6021. By doing so, the adhesiveness of the conductive film formed thereon can be enhanced, and at the same time, oxidation can be prevented. In addition, the alkali metal element slightly contained in the conductive film (A) or the conductive film (B) can be prevented from diffusing into the gate insulator film 6020. (FIG. 23C)

Next, resist masks 6023 to 6027 are formed, and the conductive layer (A) 6021 and the conductive layer (B) 6022 are etched together to form gate electrodes 6028 to 6031 and a capacitor wiring 6032. The gate electrodes 6028 to 6031 and the capacitor wiring 6032 are formed in such a manner that the layers 6028a to 6032a comprised of the conductive layer (A) and the layers 6028b to 6032b comprised of the conductive layer (B) are formed as one body respectively. In this case, the gate electrodes 6029 and 6030 formed in the driving circuit are formed so as to overlap the portions of the impurity regions 6017 and 6018 through the gate insulator film 6020. (FIG. 23D)

Figure 24A:
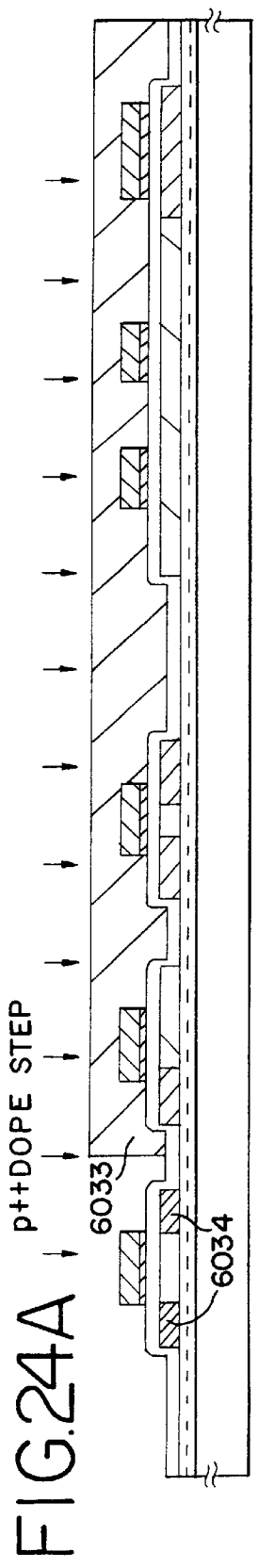
FIGS. 24A to 24D are an example of a manufacturing process of a liquid crystal panel used in a goggle type display device in accordance with the present invention.

Then, in order to form the source region and the drain region of the p-channel type TFT in the driving circuit, the step of adding an impurity element imparting p-type conductivity is carried out. Here, by using the gate electrode 6028 as a mask, impurity regions are formed in a self-alignment manner. In this case, the region in which the n-channel type TFT will be formed is coated with a resist mask 6033 in advance. Thus, impurity regions 6034 were formed by ion doping using diborane ($B_2H_6$). The concentration of boron (B) in this region is brought to $3 \times 10^{20}$ to $3 \times 10^{21}$ atoms/cm$^3$. In this specification, the concentration of the impurity element imparting p-type contained in the impurity regions 6034 is represented by (p$^+$). (FIG. 24A)

Figure 24B:
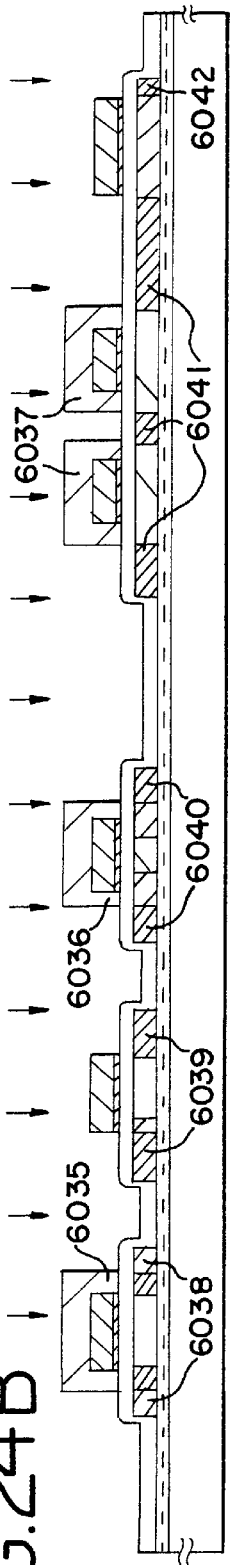

Next, in the n-channel type TFTs, impurity regions that functioned as source regions or drain regions were formed. Resist masks 6035 to 6037 were formed, an impurity element for imparting the n-type conductivity was added to form impurity regions 6038 to 6042. This was carried out by ion doping using phosphine (PH$_3$), and the phosphorus (P) concentration in these regions was set to $1 \times 10^{20}$ to $1 \times 10^{21}$ atoms/cm$^3$. In this specification, the concentration of the impurity element imparting the n-type contained in the impurity regions 6038 to 6042 formed here is represented by (n$^+$). (FIG. 24B)

In the impurity regions 6038 to 6042, the phosphorus (P) or boron (B) which was added at the preceding steps are contained, however, as compared with this impurity element concentration, phosphorus is added here at a sufficiently high concentration, so that the influence by the phosphorus (P) or boron (B) added at the preceding steps need not be taken into consideration. Further, the concentration of the phosphorus (P) that is added into the impurity regions 6038 is ½ to ⅓ of the concentration of the boron (B) added at the step shown in FIG. 24A; and thus, the p-type conductivity was secured, and no influence was exerted on the characteristics of the TFTs.

Figure 24C:
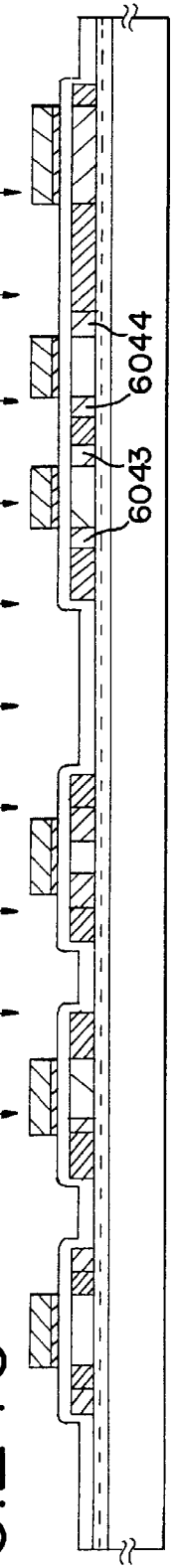

Then, the step of adding an impurity imparting n-type for formation of the LDD regions of the n-channel type TFT in the pixel matrix circuit was carried out. Here, by using the gate electrode 6031 as a mask, the impurity element for imparting n-type was added in a self-alignment manner. The concentration of phosphorus (P) added was $1 \times 10^{16}$ to $5 \times 10^{18}$ atoms/cm$^3$; by thus adding phosphorus at a concentration lower than the concentrations of the impurity elements added at the steps shown in FIG. 23A, FIG. 24A and FIG. 24B, only impurity regions 6043 and 6044 were substantially formed. In this specification, the concentration of the impurity element for imparting the n conductivity type which impurity element is contained in these impurity regions 6043 and 6044 is represented by (n$^{--}$). (FIG. 24C)

Thereafter, in order to activate the impurity elements, which were added at their respective concentrations for imparting n-type or p-type conductivity, a heat treatment step was carried out. This step can be carried out by furnace annealing, laser annealing or rapid thermal annealing (RTA). Here, the activation step was performed by furnace annealing. Heat treatment is carried out in a nitrogen atmosphere with an oxygen concentration of 1 ppm or less, preferably 0.1 ppm or less, at 400 to 800° C., generally at 500 to 600° C.; in this embodiment, the heat treatment was carried out at 550° C. for 4 hours. Further, in the case a substrate such as a quartz substrate which has heat resistance is used as the substrate 6001, the heat treatment may be carried out at 800° C. for one hour; in this case, the activation of the impurity elements and the junctions between the impurity regions into which the impurity element was added and the channel-forming region could be well formed.

By this heat treatment, on the metal films 6028b to 6032b, which form the gate electrodes 6028 to 6031 and the capacitor wiring 6032, conductive layers (C) 6028c to 6032c are formed with a thickness of 5 to 80 nm as measured from the surface. For example, in the case the conductive layers (B) 6028b to 6032b are made of tungsten (W), tungsten nitride (WN) is formed; in the case of tantalum (Ta), tantalum nitride (TaN) can be formed. Further, the conductive layers (C) 6028c to 6032c can be similarly formed by exposing the gate electrodes 6028 to 6031 to a plasma atmosphere containing nitrogen which plasma atmosphere uses nitrogen or ammonia. Further, heat treatment was carried out in an atmosphere containing 3 to 100% of hydrogen at 300 to 450° C. for 1 to 12 hours, thus performing the step of hydrogenating the island semiconductor layers. This step is a step for terminating the dangling bonds of the semiconductor layers by the thermally excited hydrogen. As another means for the hydrogenation, plasma hydrogenation (using the hydrogen excited by plasma) may be performed.

Figure 24D:
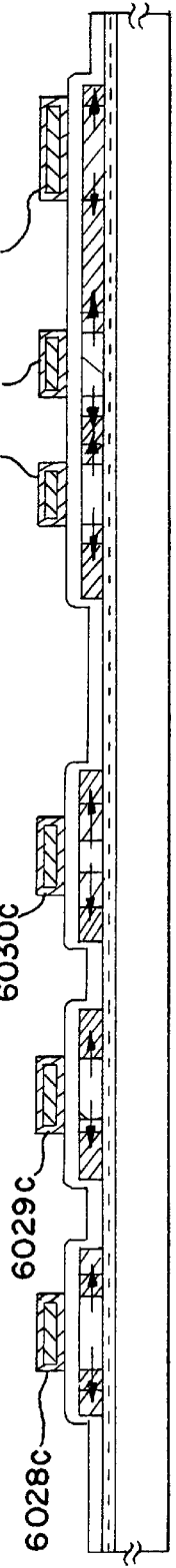

In the case the island semiconductor layers were fabricated by the crystallization method using a catalytic element from an amorphous silicon film, a trace amount of the catalytic element remained in the island semiconductor layers. Of course, it is possible to complete the TFT even in such a state however, it was more preferable to remove the residual catalytic element at least from the channel-forming region. As one of the means for removing this catalytic element, there was the means utilizing the gettering function of phosphorus (P). The concentration of phosphorus (P) necessary to perform gettering is at the same level as that of the impurity region (n$^+$) which was formed at the step shown in FIG. 24B; by the heat treatment at the activation step carried out here, the catalytic element could be gettered from the channel-forming region of the n-channel type and the p-channel type TFTs. (FIG. 24D)

After the activation and hydrogenation steps are over, a second conductive film is formed as gate wiring. This second conductive film is preferably formed of a conductive layer (D) comprised mainly of aluminum (Al) or copper (Cu) that is a low resistance material, and a conductive layer (E) comprised of titanium (Ti), tantalum (Ta), tungsten (W), or molybdenum (Mo). In this embodiment, the second conductive film was formed by using, as the conductive layer (D) 6045, an aluminum (Al) film containing 0.1 to 2 wt % of titanium (Ti) and by using a titanium (Ti) film as the conductive layer (E) 6046. The conductive layer (D) 6045 may be formed to a thickness of 100 to 400 nm (preferably, 250 to 350 nm), while the conductive layer (E) 6046 may be formed to a thickness of 50 to 200 nm (preferably, 100 to 150 nm). (FIG. 25A)

Then, in order to form gate wirings connected to the gate electrodes, the conductive layer (E) 6046 and the conductive layer (D) 6045 were etched, whereby gate wirings 6047 and 6048 and a capacitor wiring 6049 were formed. The etching treatment was carried out in such a manner that, at first, by the dry etching method using a mixture gas consisting of SiCl$_4$, Cl$_2$ and BCl$_3$, the portions extending from the surface of the conductive layer (E) to a part of the way of the conductive layer (D) were removed, and, thereafter, the conductive layer (D) was removed by the wet etching using a phosphoric acid etching solution, whereby the gate wirings could be formed, maintaining a selective workability with respect to the base layer.

A first interlayer insulating film 6050 is formed of a silicon oxide film or a silicon oxynitride film with a thickness of 500 to 1500 nm, and contact holes reaching the source regions or the drain regions, which are formed in the respective island semiconductor layers, are formed; and source wirings 6051 to 6054 and drain wirings 6055 to 6058 are formed. Though not shown, in this embodiment, these electrodes were formed from a three-layer structure which was constituted by continuously forming a Ti film with a thickness of 100 nm, an aluminum film containing Ti and having a thickness of 300 nm, and a Ti film with a thickness of 150 nm by the sputtering method.

Next, as a passivation film 6059, a silicon nitride film, a silicon oxide film or a silicon oxinitride film is formed to a thickness of 50 to 500 nm (typically, 100 to 300 nm). In the case that a hydrogenating treatment was carried out in this state, a desirable result was obtained in respect of the enhancement in characteristics of the TFTs. For example, it is preferable to carry out heat treatment in an atmosphere containing 3 to 100% of hydrogen at 300 to 450° C. for 1 to 12 hours; or, in the case that the plasma hydrogenation method was employed, a similar effect was obtained. Here, openings may be formed in the passivation film 6059 at the positions at which contact holes for connecting the pixel electrodes and drain wirings to each other will be formed later. (FIG. 25)

Figure 26:
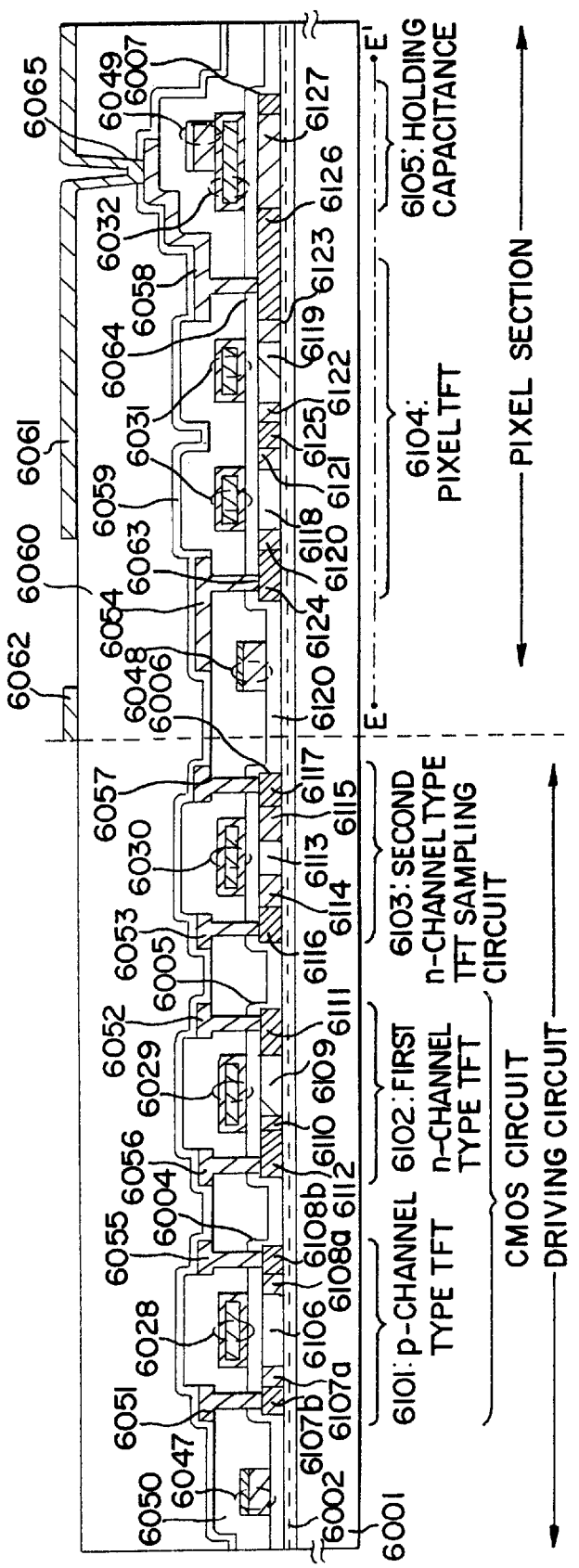
FIG. 26 is an example of a manufacturing process of a liquid crystal panel used in a goggle type display device in accordance with the present invention.

Thereafter, a second interlayer insulating film 6060 comprised of an organic resin is formed to a thickness of 1.0 to 1.5 $\mu$m. As the organic resin, polyimide, acrylic, polyamide, polyimideamide, or BCB (benzocyclobutene) can be used. Here, polyimide of the type that, after applied to the substrate, thermally polymerizes was used; it was fired at 300° C., whereby the second interlayer dielectric film was formed. Then, a contact hole reaching the drain wiring 6058 was formed in the second interlayer insulating film 6060, and pixel electrodes 6061 and 6062 were formed. The pixel electrodes can be formed by using a transparent conductive film in the case a transmission type liquid crystal panel is to be obtained, while, in the case a reflection type liquid crystal panel is to be fabricated, the pixel electrodes can be formed by a metal film. In this embodiment, a transmission type liquid crystal panel is to be fabricated, so that an indium tin oxide (ITO) film was formed to a thickness of 100 nm by the sputtering method. (FIG. 26)

In this way, a substrate having the TFTs of the driving circuit and the pixel TFTs of the pixel section on the same substrate could be completed. In the driving circuit, there were formed a p-channel TFT 6101, a first n-channel TFT 6102 and a second n-channel TFT 6103, while, in the pixel portion, there were formed a pixel TFT 6104 and a storage capacitor 6105. In this specification, such a substrate is called active matrix substrate for convenience.

The p-channel TFT 6101 in the driving circuit has a channel-forming region 6106, source regions 6107a and 6107b and drain regions 6108a and 6108b in the island semiconductor layer 6004. The first n-channel TFT 6102 has a channel-forming region 6109, an LDD region 6110 overlapping the gate electrode 6029 (such an LDD region will hereinafter be referred to as Lov), a source region 6111 and a drain region 6112 in the island semiconductor layer 6005. The length in the channel direction of this Lov region is set to 0.5 to 3.0 $\mu$m, preferably 1.0 to 1.5 $\mu$m. A second n-channel TFT 6103 has a channel-forming region 6113, LDD regions 6114 and 6115, a source region 6116 and a drain region 6117 in the island semiconductor layer 6006. As these LDD regions, there are formed an Lov region and an LDD region which does not overlap the gate electrode 6030 (such an Ldd region will hereafter be referred as Loff); and the length in the channel direction of this Loff region is 0.3 to 2.0 $\mu$m, preferably 0.5 to 1.5 $\mu$m. The pixel TFT 6104 has channel-forming regions 6118 and 6119, Loff regions 6120 to 6123, and source or drain regions 6124 to 6126 in the island semiconductor layer 6007. The length in the channel direction of the Loff regions is 0.5 to 3.0 $\mu$m. preferably 1.5 to 2.5 $\mu$m. Further, the storage capacitor 6105 comprises capacitor wirings 6032 and 6049, an insulator film composed of the same material as the gate insulator film and a semiconductor layer 6127 which is connected to the drain region 6126 of the pixel TFT 6104 and in which an impurity element for imparting the n conductivity type is added. In FIG. 26, the pixel TFT 6104 is of the double gate structure, but may be of the single gate structure, or may be of a multi-gate structure in which a plurality of gate electrodes are provided.

As described above, in this embodiment, the structure of the TFTs constituting the respective circuits can be optimized in accordance with the specifications required by the pixel TFTs and the driving circuits; and thus, the operating performance and the reliability of the semiconductor device can be enhanced. Further, since the gate electrodes are formed of a conductive material that has heat resistance, the activation of the LDD regions, the source regions and the drain regions can be easily realized, and, by forming the gate wirings of a low resistance material, the wiring resistance can be sufficiently lowered. Accordingly, the gate electrodes can be applied even to a display device in which the diagonal screen size of the pixel portion is in the 4-inch class or greater.

Further, the liquid crystal display device according to this embodiment may also be constituted in such a manner that the diagonal size of the above-mentioned pixel portion is two inches or more, the channel width of the above-mentioned pixel TFTs is not less than 0.2 $\mu$m but not greater than 2 $\mu$m (preferably, at least 0.2 $\mu$m but not more than 1.3 $\mu$m), and the film thickness of the active layer of the above-mentioned pixel TFTs is 10 nm to 50 nm.

Preferred Embodiment 10

It is possible to use a variety of liquid crystal materials in a liquid crystal panel manufactured in accordance with the above stated Embodiment. For example, the liquid crystal materials disclosed in: Furue, H, et al., "Characteristics and Driving Scheme of Polymer-stabilized Monostable FLCD Exhibiting Fast Response Time and High Contrast Ratio with Gray-scale Capability," SID, 1998; in Yoshida, T., et al., "A Full-color Thresholdless Antiferroelectric LCD Exhibiting Wide Viewing Angle with Fast Response Time," SID 97 Digest, 841, 1997; S. Inui et al., "Thresholdless antiferroelectricity in Liquid Crystals and its Application to Displays", J. Mater. Chem. 6(4), 671–673, 1996; and in U.S. Pat. No. 5,594,569 can be used.

A liquid crystal that shows antiferroelectric phase in a certain temperature range is called an antiferroelectric liquid crystal. Among a mixed liquid crystal comprising antiferroelectric liquid crystal material, there is one called thresholdless antiferroelectric mixed liquid crystal that shows electrooptical response characteristic in which transmittivity is continuously varied against electric field. Among the thresholdless antiferroelectric liquid crystals, there are some that show V-shaped electrooptical response characteristic, and even liquid crystals whose driving voltage is approximately ±2.5 V (cell thickness approximately 1 μm to 2 μm) are found.

Figure 27:
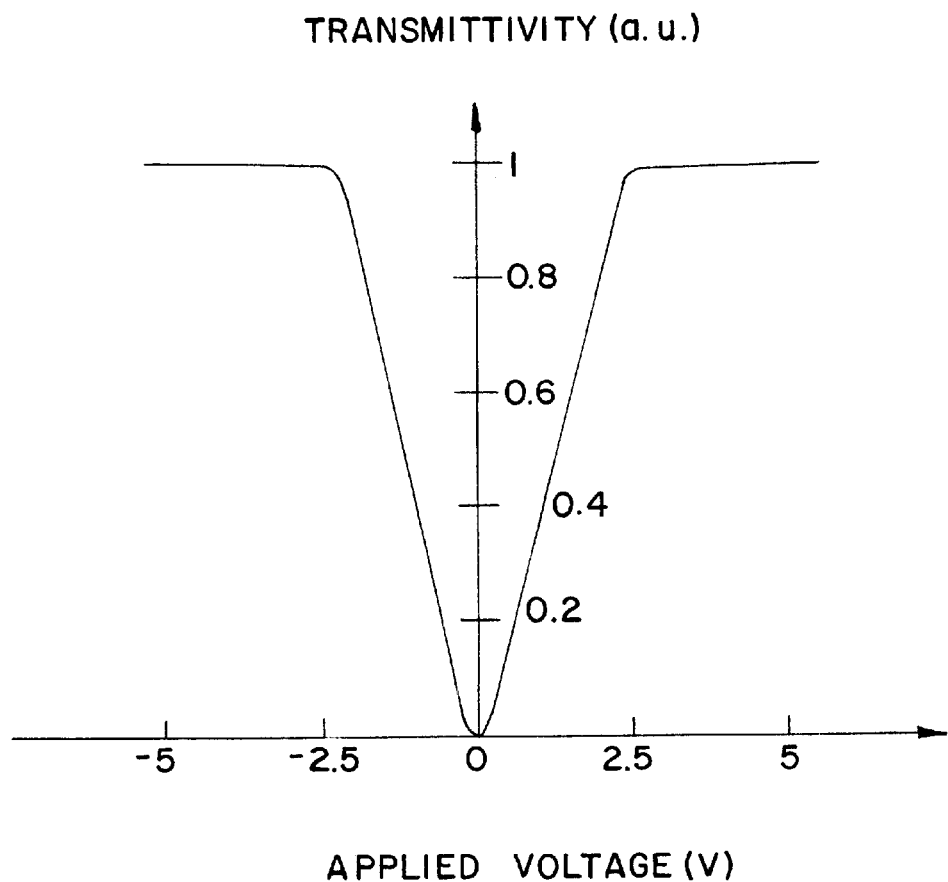
FIG. 27 is a graph showing an electrooptical characteristic shaped like a letter V of an anti-ferroelectric mixed liquid crystal having no threshold.

An example of light transmittivity characteristic against the applied voltage of thresholdless antiferroelectric mixed liquid crystal showing V-shaped electro-optical response characteristic, is shown in FIG. 27. The axis of ordinate in the graph shown in FIG. 27 is transmittivity (arbitrary unit) and the axis of the abscissas is the applied voltage. The transmitting direction of the polarizer on light incident side of the liquid crystal display is set at approximately parallel to direction of a normal line of the smectic layer of thresholdless antiferroelectric liquid crystal that approximately coincides with the rubbing direction of the liquid crystal display device. Further, the transmitting direction of the polarizer on the light radiating side is set at approximately right angles (crossed Nicols) against the transmitting direction of the polarizer on the light incident side.

As shown in FIG. 27, it is shown that low voltage driving and gray scale display is available by using such thresholdless antiferroelectric mixed liquid crystal.

It becomes possible to reduce the power supply voltage of the sampling circuit for the image signal to for example approximately 5 to 8 V in case of using such low voltage driving thresholdless antiferroelectric mixed liquid crystal to a liquid crystal panel having an analog driver. Accordingly the operation power supply voltage for the driver can be reduced and low consumption electricity and high reliability of the liquid crystal panel can be attained.

Further, also in case of using the low voltage driving thresholdless antiferroelectric mixed liquid crystal to a liquid crystal panel having a digital driver, the operation power supply voltage of the D/A converter circuit can be lowered because the output voltage of the D/A converter circuit can be lowered, and the operation power voltage of the driver can be lowered. Accordingly, low consumption electricity and high reliability of the liquid crystal panel can be attained.

Therefore the use of such low voltage driving thresholdless antiferroelectric mixed liquid crystal is effective in case of using a TFT having a relatively small LDD region (low concentration impurity region) width (for instance 0 to 500 nm, or 0 to 200 nm).

Further, thresholdless antiferroelectric mixed liquid crystal has large spontaneous polarization in general, and the dielectric constant of the liquid crystal itself is large. Therefore, comparatively large storage capacitor is required in the pixel in case of using thresholdless antiferroelectric mixed liquid crystal for a liquid crystal panel. It is therefore preferable to use thresholdless antiferroelectric mixed liquid crystal having small spontaneous polarity. It is also acceptable to compensate a small storage capacitor by lengthening a writing period of gray scale voltage to the pixel (pixel field period) by applying line sequential driving method as the driving method of the liquid crystal panel.

A low consumption electricity of a liquid crystal panel is attained because low voltage driving is realized by the use of such thresholdless antiferroelectric mixed liquid crystal.

Further, any of liquid crystal can be used as a display medium of the liquid crystal panels of goggle display device of the present invention on condition that the liquid crystal has an electro-optical characteristic shown in FIG. 27.

Preferred Embodiment 11

Figure 28:
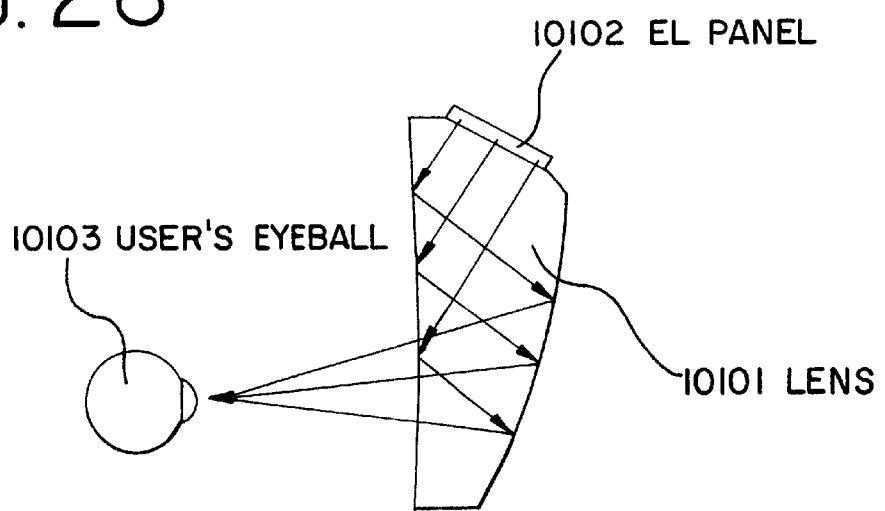
FIG. 28 is an illustration showing the constitution of an optical element and an EL panel of a goggle type display device in accordance with the present invention.

The present preferred embodiment will be described with reference to FIG. 28. A reference numeral 10101 designates a lens, a reference numeral 10102 designates an EL panel, and a reference numeral 10103 designates a user's eyeball. An image displayed on the EL panel passes through the lens and is enlarged and then is projected on the retina of the user's eyeball.

The EL panel is constituted by an EL element described in the following.

The EL element has a structure in which an EL layer is sandwiched between a pair of electrodes (an anode and a cathode). The EL layer usually has a laminate structure. Typically, there is provided a laminate structure of "a hole carrying layer/a luminous layer/an electron carrying layer" which is proposed by Tang and others of Eastman Kodak Company. This structure has a very high luminous efficiency and hence is adopted by almost all the EL panels now being developed.

In addition, a structure in which a hole injecting layer/a hole carrying layer/a luminous layer/an electron carrying layer or a hole injecting layer/a hole carrying layer/a luminous layer/an electron carrying layer/an electron injecting layer are laminated on an anode in this order may be adopted. It is also recommended that the luminous layer is doped with fluorescent pigment or the like.

In the present specification, all layers provided between the cathode and the anode are collectively called an EL layer. Accordingly, the hole injecting layer, the hole carrying layer, the luminous layer, the electron carrying layer, and the electron injecting layer which have been described above are included in the EL layer.

A predetermined voltage is applied to the EL layer including the above-mentioned structure by a pair of electrodes to join carriers again in the luminous layer to emit light. In this connection, it is called "an EL element drives" in the present specification that "an EL element emits light". In the present specification, a light emitting element formed of an anode, an EL layer, and a cathode is called an EL element.

Preferred Embodiment 12

Figure 29:
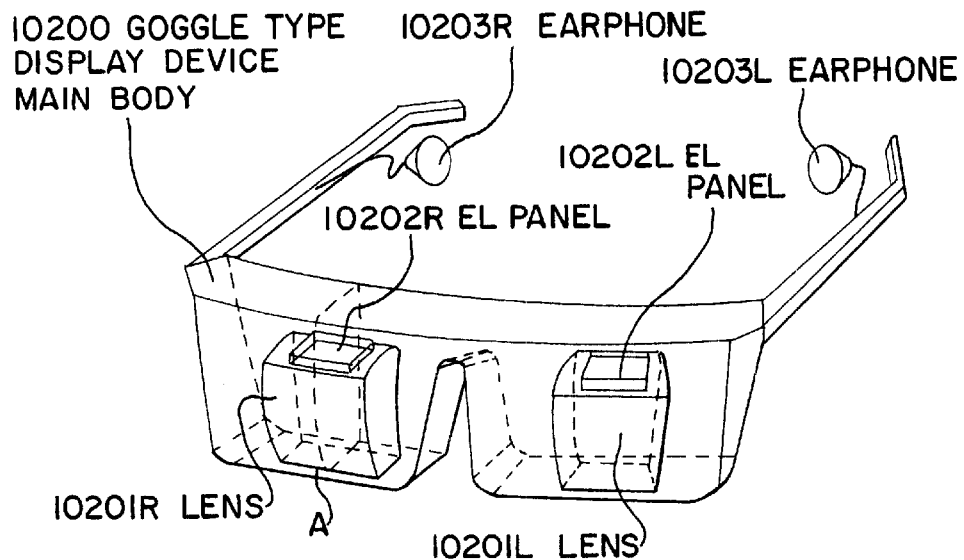
FIG. 29 is a schematic illustration of a goggle type display device for both eyes in the preferred embodiment 11.

Referring now to FIG. 29, in FIG. 29 is shown a schematic constitutional illustration of the goggle type display device which is used with both eyes of the present preferred embodiment. In the present preferred embodiment, two EL panels are used and display images to both eyes. A reference character 10200 designates a goggle type display device body, reference characters 10201R and 10201L designate lenses, reference characters 10202R and 10202L designate EL panels, and reference characters 10203R and 10203L designate earphones. In this connection, a driving device is not shown.

In the case of a goggle type display device having a voice reproducing device (not shown), voice is sent to a user through an earphone. A goggle type display device having no voice reproducing device is not provided with an earphone.

Figure 30:
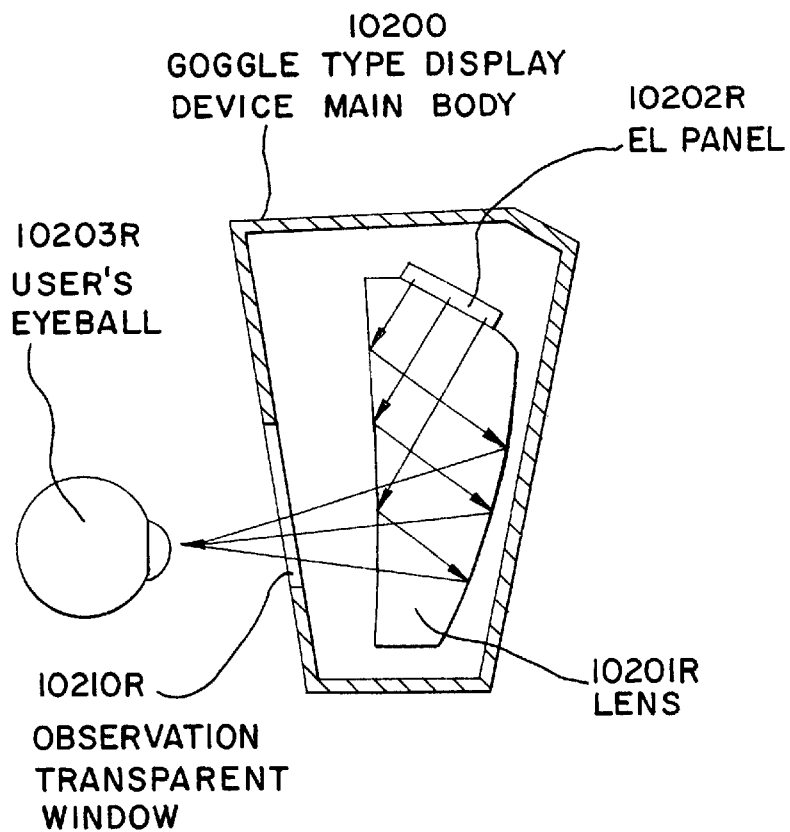
FIG. 30 is a schematic illustration of a goggle type display device for both eyes in the preferred embodiment 12.

FIG. 30 is a cross-sectional view of the A part in FIG. 29 of a goggle type display device of the present preferred embodiment. An image shown in the EL panel 10202R is enlarged through the lens 10201R and is passed through an observation transparent window 10210R and then is projected on the retina of the eyeball of a user 10203R.

Also, it is also recommended that the optical element and the EL panel of the preferred embodiments 3, 4, 5, or 6 be combined with the goggle type display device of the present preferred embodiment. It is not intended to limit the shape of the optical element to that of the present preferred embodiment and those of the preferred embodiments 3, 4, 5, and 6.

Preferred Embodiment 13

Figure 31:
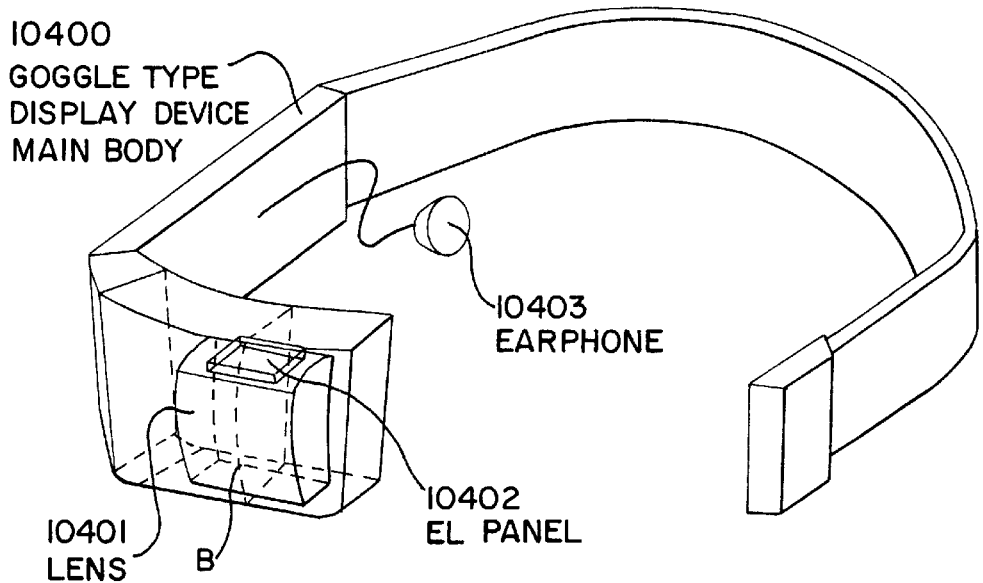
FIG. 31 is a schematic illustration of a goggle type display device for a single eye in the preferred embodiment 13.

FIG. 31 is a schematic constitutional illustration of the goggle type display device which is used with one eye of the present preferred embodiment. In the present preferred embodiment, a right eye can see an image shown by a display device and a left eye can see outside, which enables a user to walk or work with the goggle type display device attached to his body. A reference character 10400 designates a goggle type display device body, a reference character 10401 designates a lens, a reference character 10402 designates an EL panel, and a reference character 10403 designates an earphone. In this connection, a driving device is not shown.

In the case of a goggle type display device having a voice reproducing device (not shown), voice is sent to a user through an earphone. When the voice is heard with both ears, the voice reproducing device is provided with two earphones and when the voice is heard with one ear, it is provided with one earphone. In the case of a goggle type display device having no voice reproducing device, it is not provided with the earphone.

In this connection, it is also recommended that the goggle type display device used with one eye of the present preferred embodiment has a structure in which a display shown by the image device is seen with the left eye and in which the outside is seen with the right eye.

Also, a cross-sectional view in the B part in FIG. 31 is the same as that in FIG. 30, and an EL panel, a lens, and a goggle type display device body correspond to those shown in FIG. 30.

Also, it is recommended that the optical element and the EL panel of the preferred embodiments 3, 4, 5, or 6 be combined with the goggle type display device of the present preferred embodiment. Also, the shape of the optical element is not limited to that of the present preferred embodiment and those of the present preferred embodiments 3, 4, 5, and 6.

Preferred Embodiment 14

Figure 32:
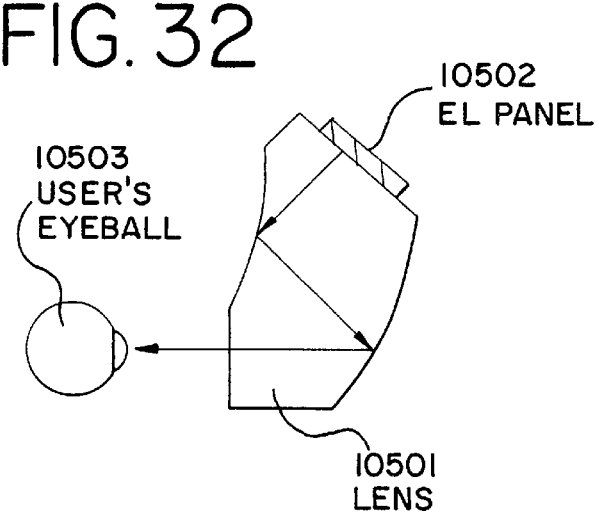
FIG. 32 is an illustration showing the constitution of an optical element and an EL panel in the preferred embodiment 14.

Referring now to FIG. 32, in FIG. 32 are shown a lens and an EL panel of a display unit both of which can be used for the goggle type display devices of the preferred embodiment 1 and the preferred embodiment 3. A reference character 10501 designates a lens, a reference character 10502 designates an EL panel, and a reference character 10503 designates the eyeball of a user. An image shown in the EL panel 10502 is enlarged through the lens 10501 and is projected on the retina of the user's eyeball 10503. In the present preferred embodiment, the shape of the lens is different from those of the preferred embodiment 1 and the preferred embodiment 3 and the plane of the lens seen by the user is flat.

Preferred Embodiment 15

Figure 33:
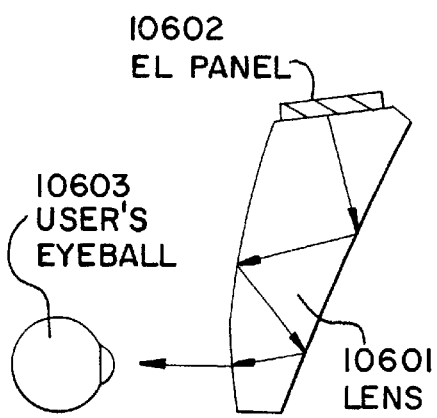
FIG. 33 is an illustration showing the constitution of an optical element and an EL panel in the preferred embodiment 15.

Referring now to FIG. 33, in FIG. 33 are shown a lens and an EL panel of a display unit both of which can be used for the goggle type display devices of the preferred embodiment 1 and the preferred embodiment 3. In the present preferred embodiment, the shape of the lens is different from those of the preferred embodiments 1, 2, or 3 and is designed such that an image moves a long distance in the lens. A reference character 10601 designates a lens, a reference character 10602 designates an EL panel, and a reference character 10603 designates the eyeball of a user. An image shown in the EL panel 10602 is enlarged through the lens 10601 and is reflected three times in the lens 10601 and then is projected on the retina of the user's eyeball 10603.

Preferred Embodiment 16

Figure 34:
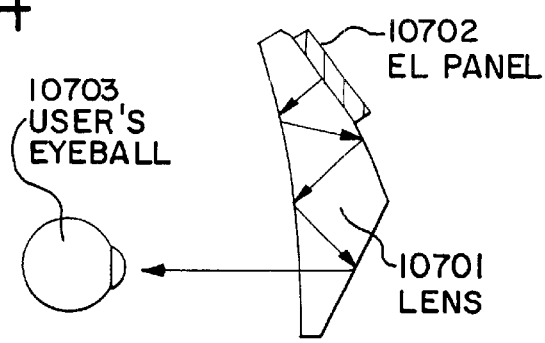
FIG. 34 is an illustration showing the constitution of an optical element and an EL panel in the preferred embodiment 16.

Referring now to FIG. 34, in FIG. 34 are shown a lens and an EL panel of a display unit both of which can be used for the goggle type display devices of the preferred embodiment 1 and the preferred embodiment 3. In the present preferred embodiment, the shape of the lens is different from those of the preferred embodiments 1, 2, 3, or 4. A reference character 10701 designates a lens, a reference character 10702 designates an EL panel, and a reference character 10703 designates the eyeball of a user. An image shown in the EL panel 10702 is enlarged through the lens 10701 and is reflected four times in the lens 10701 and then is projected on the retina of the user's eyeball 10703.

Preferred Embodiment 17

Figure 35:
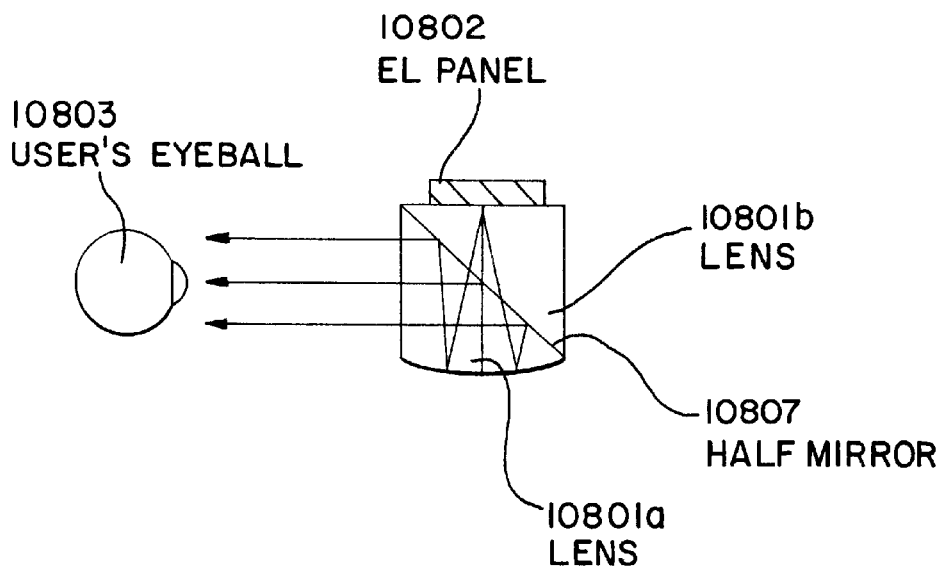
FIG. 35 is an illustration showing the constitution of an optical element and an EL panel in the preferred embodiment 17.

Referring now to FIG. 35, in FIG. 35 are shown a lens and an EL panel of a display unit both of which can be used for the goggle type display devices of the preferred embodiment 1 and the preferred embodiment 3. In the present preferred embodiment, the shape of the lens is, different from those of the preferred embodiments 1, 2, 3, 4, or 5, it is comprised of 2 lenses. Reference characters 10801a and 10801b designate lenses, a reference character 10802 designates an EL panel, a reference character 10803 designates the eyeball of a user, and a reference character 10807 designates a half mirror. An image shown in the EL panel 10802 is enlarged through the lens 10801b, the half mirror 10807, and the lens 10801a and is passed through the lens 10801a again and then is reflected by the half mirror 10807 and then is projected on the retina of the user's eyeball 10803.

Preferred Embodiment 18

Figure 36:
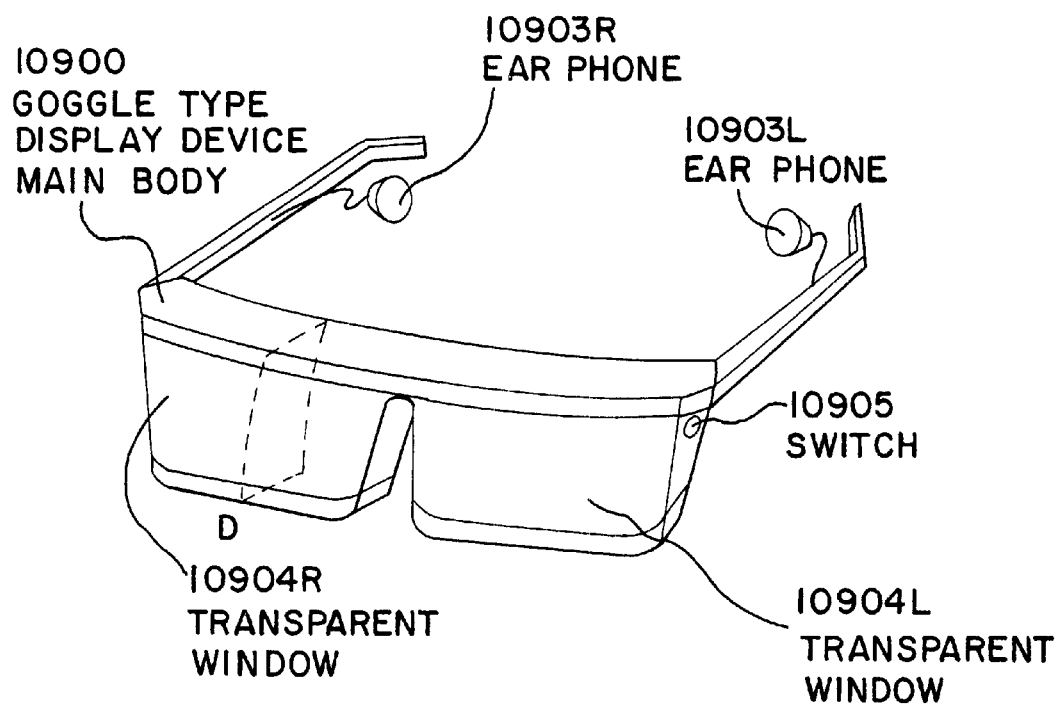
FIG. 36 is a cross-sectional view of a goggle type display device for both eyes in the preferred embodiment 18.
Figure 37A:
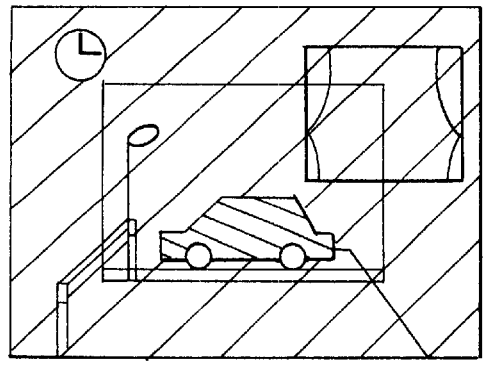
FIG. 37 is an image projected on the retina of an eyeball in the preferred embodiment 18.
Figure 37B:
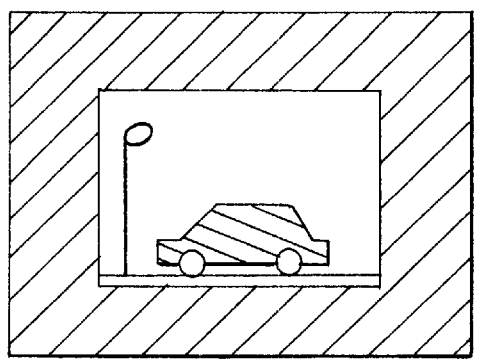

Referring now to FIG. 36, in FIG. 36 is shown the goggle type display device of the present preferred embodiment. In the present preferred embodiment, the goggle type display device is provided with transparent windows 10904R and 10904L through which a forward scene is observed and hence is different from the goggle type display device in the preferred embodiment 1. This enables the user to see the forward scene of the goggle type display device and an image displayed on the display unit at the same time, as is shown in FIG. 37(A). A switch 10905 is used for switching back and forth between a mode in which the forward scene of the goggle type display device and the image displayed on the display unit can be seen at the same time, as is shown in FIG. 37(A), and a mode in which only the image displayed on the display unit can be seen, as is shown in FIG. 37(B).

Figure 38:
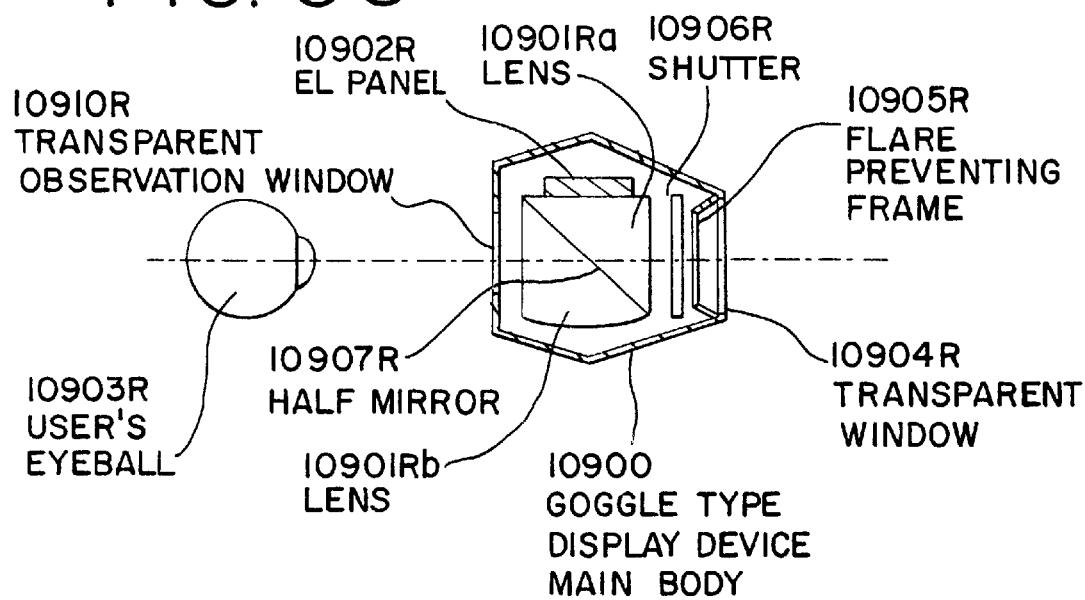
FIG. 38 is a cross-sectional view of a goggle type display device for both eyes in the preferred embodiment 18.

FIG. 38 is a cross-sectional view when a D part in FIG. 36 is cut. In FIG. 38, reference characters 10901Ra and 10901Rb designate lenses, a reference character 10902R designates an EL panel, and a reference character 10903R designates a user's eyeball. A forward scene can be observed through a transparent window 10904R, a shutter 10906R, the lens 10901Rb, a half mirror 10907R, the lens 10901Ra and a transparent observation window 10910R. An image shown in the EL panel 10902R is enlarged through the lens 10901Rb, the half mirror 10907R, and the lens 10901Ra and is passed again through the lens 10901Ra and then is reflected by the half mirror 10907R and then is projected on the retina of the user's eyeball 10903R.

A flare preventing frame 10905R is provided so that it prevents the harmful light of outside light from entering the device and may be integrally formed with a display device body 10900 or may be formed separately from it.

The shutter 10906R has the job of obstructing or passing a forward scene through the transparent window 10904R by using a switch 10905. The shutter 10906R may be the one obstructing light or the one having optical anisotropy like the liquid crystal.

The optical element usable in the present preferred embodiment is not limited to the one described in the present preferred embodiment.

Preferred Embodiment 19

A method for fabricating an EL (electro-luminescence) panel is described in the present embodiment.

Figure 39A:
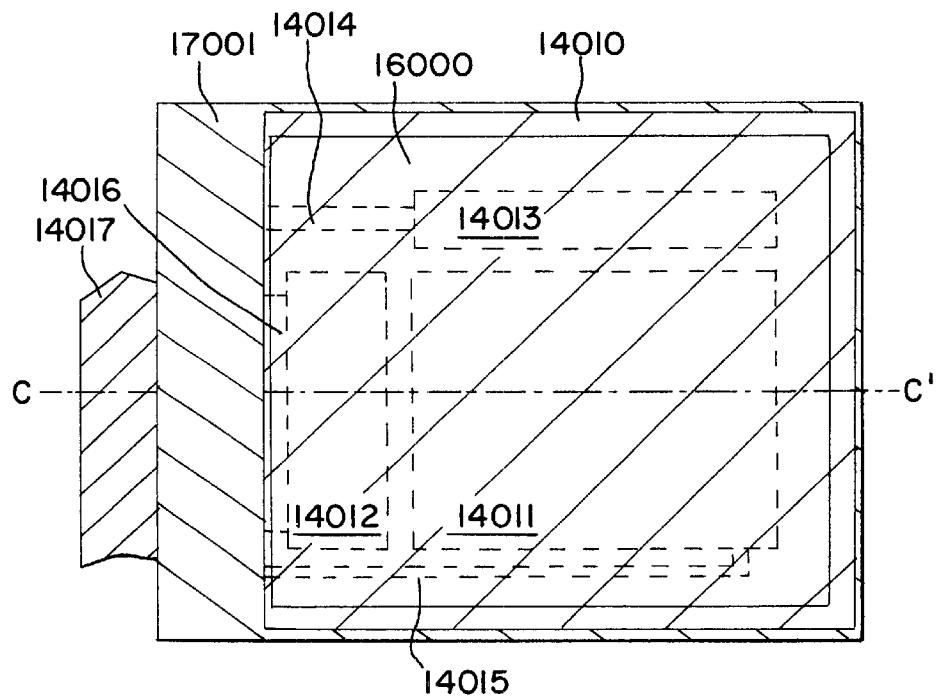
FIGS. 39A and 39B are a plan view and a cross-sectional view of an EL panel used in the preferred embodiment 19.

FIG. 39A is a top view of an EL panel according to this embodiment. In FIG. 39A, reference numeral 14010 denotes a substrate; 14011, a pixel portion; 14012, a source side driver circuit; and 14013, a gate side driver circuit. Each of the driver circuits reach an FPC 14017 through wirings 14014 to 14016, and further connected to external equipment.

Here, a cover member 16000, a sealing material (also called a housing material) 17000 and a sealant (a second sealing material) 17001 are disposed to surround at least the pixel section, preferably the driver circuit and the pixel section.

Figure 39B:
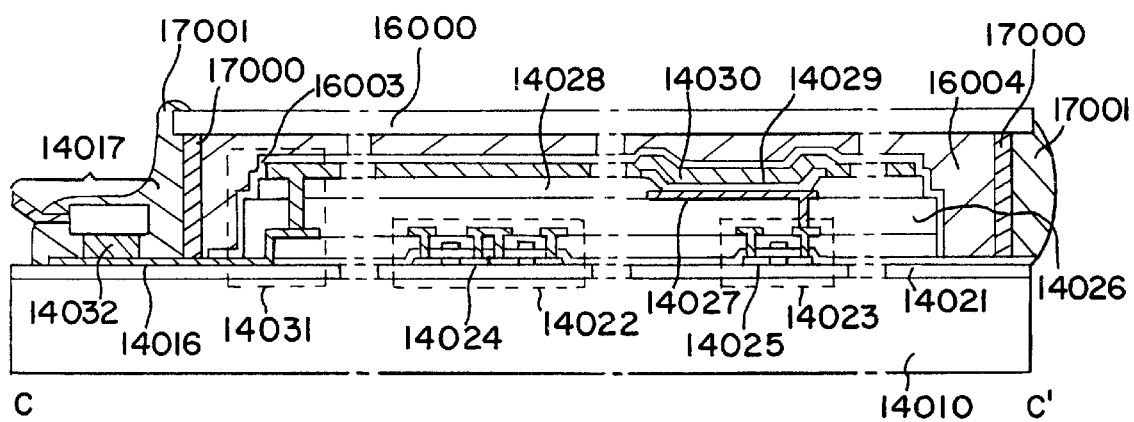

FIG. 39B shows across section at C–C' of FIG. 39A in which a driver circuit TFT (note that a CMOS circuit having a combination of an N channel TFT and a P channel TFT is shown here) 14022 and a pixel TFT (note that only a TFT for controlling the current flowing to an EL element is shown here) 14023 are formed over the substrate 14010 and a base film 14021.

Upon completion of the driver circuit TFT 14022 and the pixel section TFT 14023 through a known fabrication method, a pixel electrode 14027 made of a transparent conductive film and electrically connected to a drain of the pixel section TFT 14023 is formed over an interlayer insulating film (flattening film) 14026 which comprises a resin material. A compound of indium oxide and tin oxide (called ITO) or a compound of indium oxide and zinc oxide can be used as the transparent conductive film. After forming the pixel electrode 14027, an insulating film 14028 is formed and an opening section is formed on the pixel electrode 14027.

An EL layer 14029 is next formed. The EL layer 14029 may have a laminate structure in which known EL materials (hole injection layer, hole transport layer, light emitting layer, electron transport layer, or electron injection layer) are freely combined, or may have a single layer structure. Known techniques may be used in forming either structure. EL materials are divided into small molecular materials and polymer materials. The evaporation method is used for the small molecular materials while a simple method such as spin coating, printing method and ink jet method may be used for the polymer materials.

In this embodiment, evaporation is employed with the use of a shadow mask to form the EL layer. The shadow mask is used to form a light emitting layer capable of emitting light different in wavelength for each pixel (red-colored light emitting layer, green-colored light emitting layer and blue-colored light emitting layer), so that color display is obtained. There are other color display systems, such as a system using in combination a color conversion layer (CCM) and a color filter, and a system using in combination a white-light emitting layer and a color filter. Any of these systems may be employed. Needless to say, the EL display device may be of single-colored light emission.

After forming the EL layer 14029, a cathode 14030 is formed thereon. It is preferable to remove as much as possible the moisture and oxygen present in the interface between the cathode 14030 and the EL layer 14029. Measures such as depositing the EL layer 14029 and the cathode 14030 sequentially in vacuum, or forming the EL layer 14029 in an inert atmosphere and then forming the cathode 14030 without exposing it to the air, are needed. The present embodiment enabled such deposition by employing a multi-chamber deposition system (cluster tool system).

In this embodiment a lamination structure consisting of a LiF (lithium fluoride) film and an Al (aluminum) film is used as the cathode 14030. Specifically, a LiF (lithium fluoride) film with a thickness of 1 nm is formed on the EL layer 14029 by evaporation and an aluminum film with a thickness of 300 nm is formed thereon. Needless to say, a MgAg electrode, which is a known cathode material, may be used. The cathode 14030 is then connected to the wiring 14016 in a region denoted by 14031. The wiring 14016 is a power supply line for providing the cathode 14030 with a preset voltage, and is connected to the FPC 14017 through a conductive paste material 14032.

In order to electrically connect the cathode 14030 to the wiring 14016 in the region denoted by 14031, contact holes have to be formed in the interlayer insulating film 14026 and the insulating film 14028. These holes may be formed in etching the interlayer insulating film 14026 (in forming a contact hole for pixel electrode) and in etching the insulating film 14028 (in forming the opening prior to the formation of the EL layer). Alternatively, the contact holes may be formed by etching at once both the insulating film 14028 and the interlayer insulating film 14026 when the insulating film 14028 is to be etched. In this case, an excellent shape may be obtained for the contact holes if the interlayer insulating film 14026 and the insulating film 14028 are made of the same resin material.

A passivation film 16003, a filling material 16004 and the cover member 16000 are formed to cover the surface of the thus formed EL element.

Further, the sealing material 17000 is arranged in between the cover member 16000 and the substrate 14010, and the sealant (second sealing material) 17001 is formed outside the sealing material 17000 so that the EL element portion is enclosed.

At this point, the filling material 16004 serves also as an adhesive for adhering the cover member 16000. A material usable as the filling material 16004 is PVC (polyvinyl chloride), epoxy resin, silicone resin, PVB (polyvinyl butyral) or EVA (ethylene vinyl acetate). Providing a drying agent inside the filling material 16004 is preferable, since moisture-absorbing effect can be maintained.

The filling material 16004 may contain a spacer therein. The spacer may be made of a granular substance such as BaO, giving the spacer itself moisture-absorbing property.

In case of providing a spacer, the passivation film 16003 can release the spacer pressure. A resin film for releasing the spacer pressure may be formed separately from the passivaton film.

Examples of the usable cover member 16000 include a glass plate, an aluminum plate, a stainless steel plate, an FRP (fiberglass-reinforced plastics) plate, a PVF (polyvinyl fluoride) film, a Mylar™ film, a polyester film and an acrylic film. In case of using PVB or EVA for the filling material 16004, preferable cover member is a sheet having a structure in which an aluminum foil of several tens μm in thickness is sandwiched between PVF films or Mylar™ films.

Note that light transmitting property is required for the cover member 16000 depending on the direction of light emitted from the EL element (light emission direction).

The wiring 14016 is electrically connected to the FPC 14017 passing through the clearance defined by the substrate 14010 and by the sealing material 17000 and the sealant 17001. Though explanation here is made on the wiring 14016, the rest of the wirings, namely, wirings 14014, 14015 similarly pass under the sealing material 17000 and the sealant 17001 to be electrically connected to the FPC 14017.

Note that though a cover material 16000 is adhered after disposing a filling material 16004 and then a sealing material 17000 is provided to cover the side face (exposed surface) of the filling material 16004 in the present embodiment, the filling material 16004 may be disposed after providing the cover material 16000 and the sealing material 17000. In this case, a filling material injection hole is provided to reach the clearance formed between the substrate 14010, and the cover material 16000 and the sealing material 17000. The clearance is then vacuumed ($10^{-2}$ Torr or less) and the filling material is injected into the clearance by first immersing the injection hole into a container filled with the filling material, and then setting the pressure outside the clearance higher then that of the clearance.

Preferred Embodiment 20

In the present preferred embodiment, an embodiment having an EL panel different from that of the preferred embodiment 9 will be described with reference to FIG. 40(A) and FIG. 40(B). The same reference numbers designate the same parts in FIG. 39(A) and FIG. 39(B) and hence the descriptions of them will be omitted.

Figure 40A:
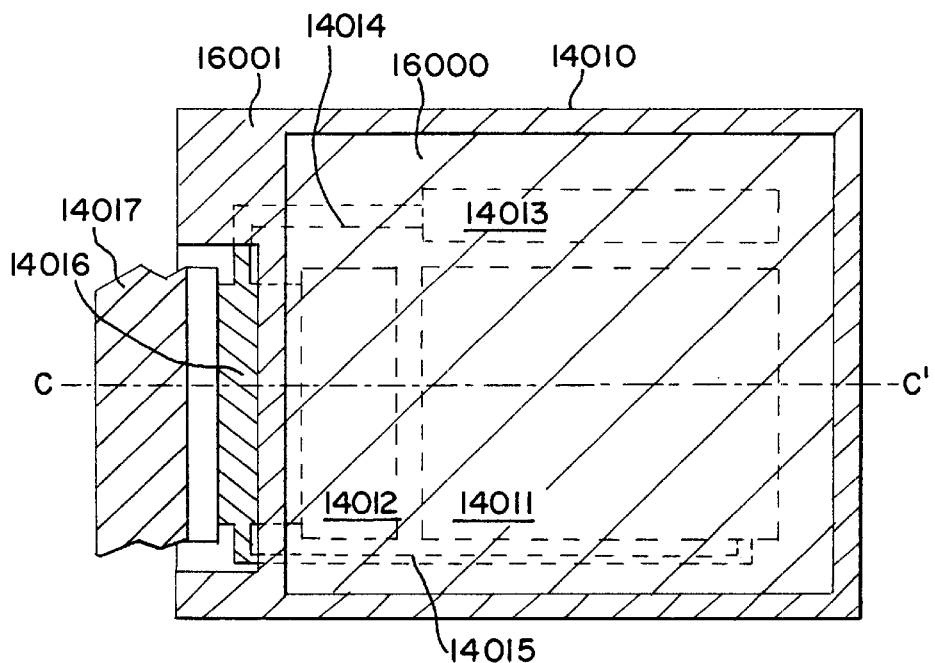
FIGS. 40A and 40B are a plan view and a cross-sectional view of an EL panel used in the preferred embodiment 20.
Figure 40B:
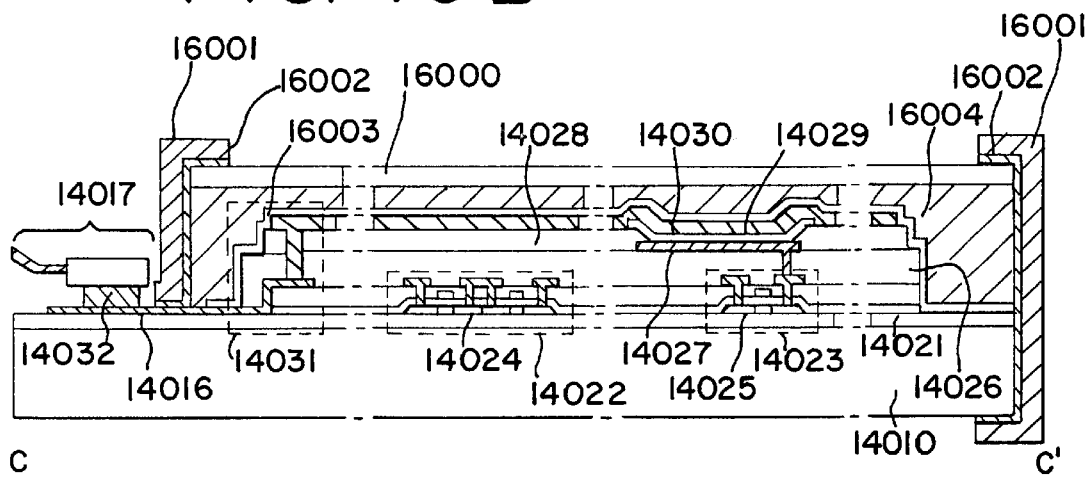

FIG. 40(A) is a plan view of the EL panel of the present preferred embodiment and FIG. 40(B) is a cross-sectional view taken on a line C–C' in FIG. 40(A).

According to the preferred embodiment 9, manufacturing processes are performed until a passivation film 16003 covering the surface of an EL element is formed.

Further, a filling material 16004 is formed over the EL element such that it covers the EL element. The filling material 16004 also functions as an adhesive for bonding a covering member 16000. As the filling material 16004 can be used PVC (polyvinyl chloride), epoxy resin, silicone resin, PVB (polyvinyl butyral), or EVA (ethylene vinyl acetate). It is desirable to provide a drying agent in the filling material 16004 because it can hold a moisture absorbing effect.

Also, it is recommended that a spacer be provided in the filling material 16004. The spacer may be formed of a particle-like material made of BaO or the like to provide the spacer itself with moisture absorbency.

If the spacer is provided, the passivation film 16003 can relieve a spacer pressure. Also, it is recommended that a resin film or the like for relieving the spacer pressure be provided in addition to the passivation film 16003.

Also, as the covering member 16000 can be used a glass plate, an aluminum plate, a stainless plate, a FRP (Fiberglass-Reinforced Plastics) plate, a PVF (polyvinyl fluoride) film, a Mylar film, a polyester film, or an acrylic film. In this connection, when the PVB or the EVA is used as the filling material 16004, it is desirable to use a sheet having a structure of sandwiching an aluminum foil having a thickness of several tens of μm with the PVF films or the Mylar films.

However, depending on the direction of light (direction of radiation of light) emitted by the EL element, the covering member 16000 needs to have transparency.

Next, the covering member 16000 is bonded with the filling material 16004 and then a frame member 16001 is mounted so that it covers the sides (exposed surfaces) of the filling material 16004. The frame member 16001 is bonded with a sealing material (functioning as an adhesive) 16002. It is desirable to use a photo-cured resin as the sealing material 16002, but a thermosetting resin may be used if the EL layer has heat resistance. In this connection, it is desirable that the sealing material 16002 prevents moisture or oxygen from passing therethrough as much as possible. Also, a drying agent may be added to the sealing material 16002.

Also, a wiring 14016 is electrically connected to a FPC 14017 through a gap between the sealing material 16002 and a substrate 14010. In this connection, although the wiring 14016 has been described here, in a like manner, the other wirings 14014, 14015 are also electrically connected to the FPC 14017 through under the sealing material 16002.

In the present preferred embodiment, the filling material 16004 is provided and then the covering member 16000 is bonded and then the frame member 16001 is mounted such that it covers the sides (exposed surfaces) of the filling material 16004, but it is also recommended that the covering member 16000 and the frame member 16001 be mounted and that the filling material 16004 be then provided. In this case, there is provided a filling-material injection port communicating with the gap formed by the substrate 14010, the covering member 16000 and the frame member 16001. The gap is evacuated to a vacuum (less than $10^{-2}$ Torr) and then the injection port is dipped in a tank filled with the filling material and an atmospheric pressure outside the gap is made higher than an atmospheric pressure inside the gap, whereby the gap is filled with the filling material.

Preferred Embodiment 21

Figure 41:
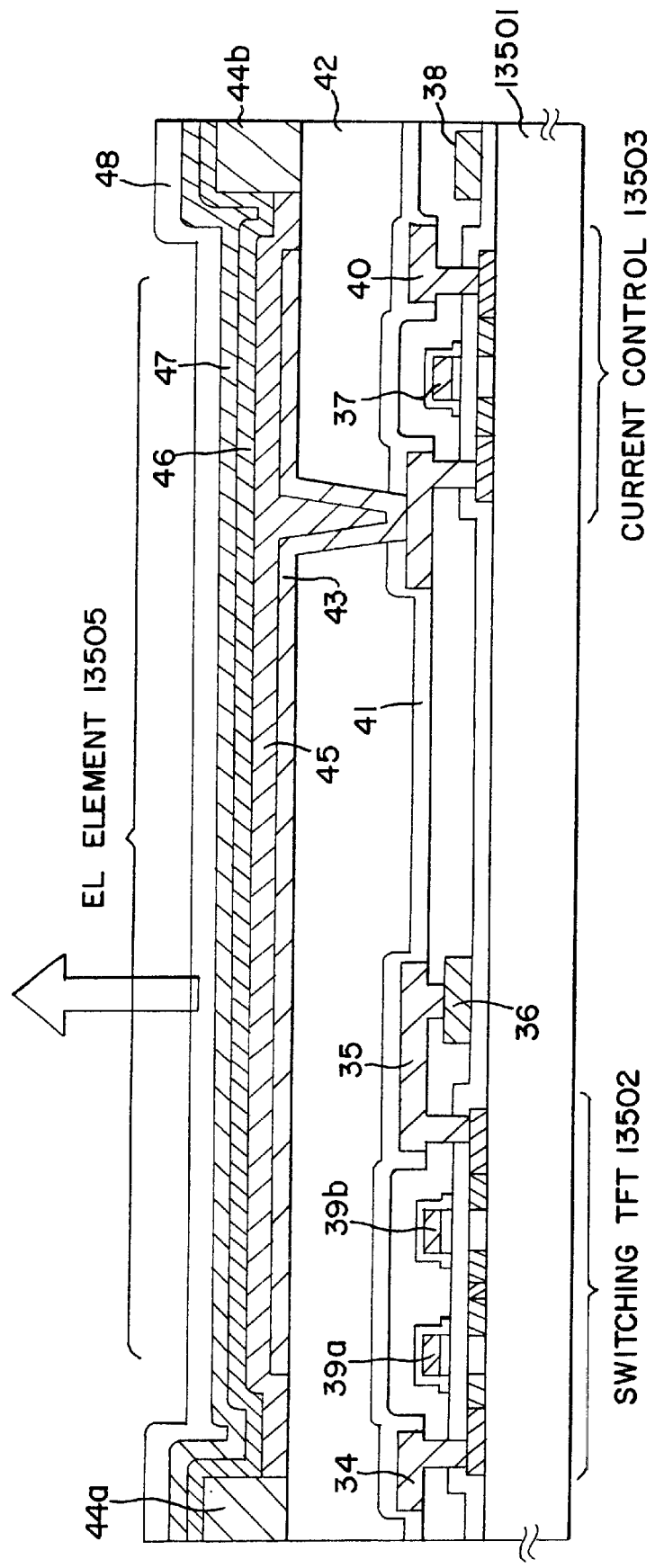
FIG. 41 is a cross-sectional view of a pixel part of an EL panel used in the preferred embodiment 21.
Figure 42A:
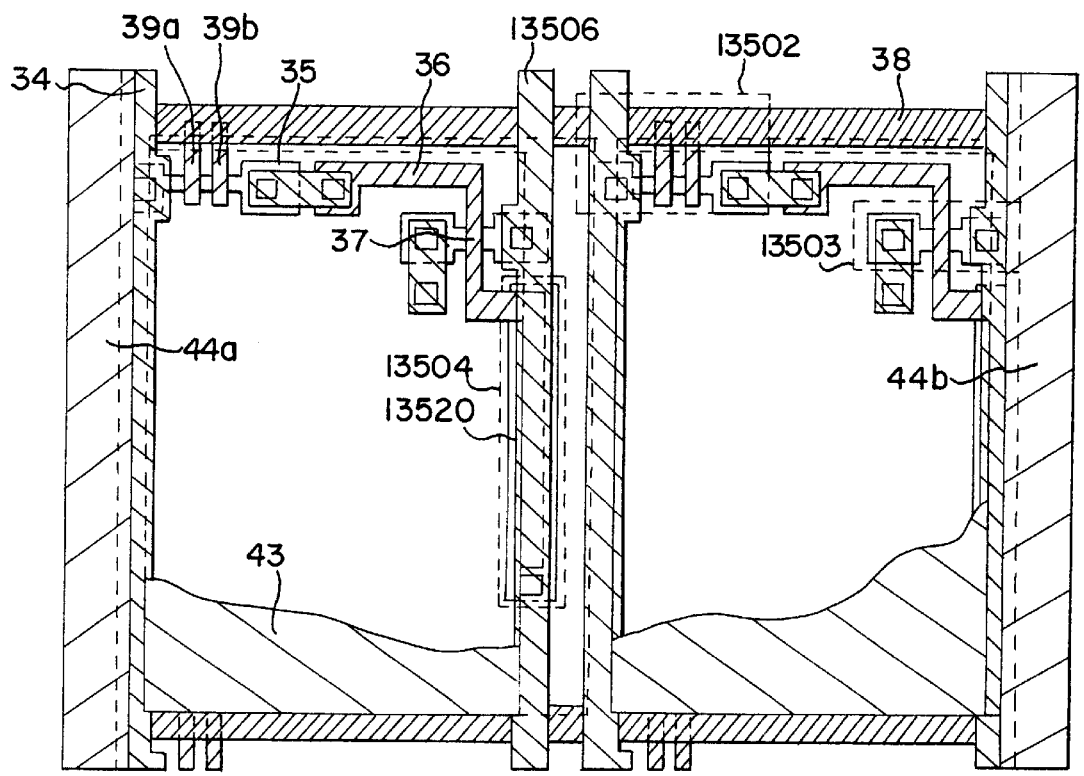
FIGS. 42A and 42B are a plan structural view and a circuit diagram of an EL panel used in the preferred embodiment 21.
Figure 42B:
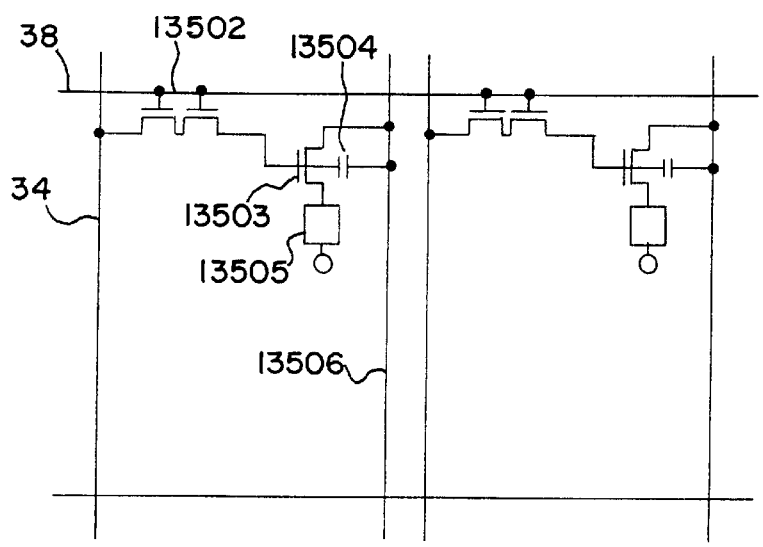

In embodiment 21, a more detailed cross sectional structure of a pixel section in an EL display panel is shown in FIG. 41, a top view structure is shown in FIG. 42A, and a circuit diagram is shown in FIG. 42B. Common reference numerals are used in FIGS. 41, 42A and 42B, and therefore they may be referred to mutually.

In FIG. 41, a switching TFT 13502 disposed on a substrate 13501 may use a known n-channel TFT structure fabricated through a known method. A double gate structure is used in embodiment 21. However, there are no large differences in structure or process of manufacturing, and therefore an explanation of these is omitted. Note that, by using a double gate structure, in essence the structure is two TFTs in series, which has the advantage that the off current value can be lowered. Additionally, although embodiment 21 has a double gate structure, a single gate structure may also be used, as may a triple gate structure or a multiple gate structure having a larger number of gates. Further, it is acceptable to form the switching TFT by using a p-channel TFT formed in accordance with a known manufacturing method.

A current control TFT 13503 is formed using an n-channel TFT formed in accordance with a known method. At this point, a drain wiring 35 of the switching TFT 13502 is electrically connected to a gate electrode 37 of the current control TFT by a wiring 36. Further, the wiring denoted by the reference numeral 38 is a gate wiring which electrically connects gate electrodes 39a and 39b of the switching TFT 13502.

The current control TFT 13503 is an element for controlling the amount of current flowing in the EL element, and therefore it is an element in which there is a great danger of degradation due to heat or due to hot carriers because there is a large current flow. Therefore, the structure of the present invention, in which on the drain side of the current control TFT 13503 an LDD region is formed to overlap a gate electrode through a gate insulating film, is extremely effective.

Furthermore, a single gate structure is shown in the figures for the current control TFT 13503 in embodiment 21, but a multiple gate structure, with a plural number of TFTs connected in series, may also be used. In addition, a structure in which a plural number of TFTs are connected in parallel, in essence dividing the channel forming region into a plural number of channel forming regions so as to perform heat radiation with a high efficiency, may also be used. This type of structure is an effective countermeasure to heat degradation.

In addition, the wiring which becomes the gate electrode 37 of the current control TFT 13503 overlaps a drain wiring 40 of the current control TFT 13503 through an insulating film in the region shown by reference numeral 13504, as shown in FIG. 42A. A capacitor is formed at this point in the region shown by reference numeral 13504. The storage capacitor 13503 is formed between a semiconductor film 13520 that is electrically connected to the power supply line 13506, an insulating film (not shown) of the same layer as the gate insulating film, and the wiring 36. Further it is possible to use the capacitance formed by the wiring 36, a layer of the same layer as the first interlayer insulating film (not shown), and the power supply line 13506. The capacitor 13504 functions as a capacitor for maintaining the voltage applied to the gate electrode 37 of the current control TFT 13503. Note that the drain of the current control TFT is connected to a current supply line (power source line) 13506, and a fixed voltage is applied at all times.

A first passivation film 41 is formed on the switching TFT 13502 and the current control TFT 13503, and a leveling film 42 formed of a resin insulating film is formed thereon. It is very important to level the step due to the TFTs using the leveling film 42. An EL layer formed later is extremely thin, so there are cases in which luminescence is caused to be defective due to the existence of steps. Therefore, to form the EL layer with as level a surface as possible, it is preferable to perform leveling before forming a pixel electrode.

In addition, reference numeral 43 denotes a pixel electrode (EL element cathode) that comprises a conducting film with high reflectivity, and is electrically connected to the drain of the current control TFT 13503. It is preferable to use a low resistance conducting film for the pixel electrode 43, such as an aluminum alloy film, a copper alloy film, and a silver alloy film, or a laminate of such films. Of course, a laminate structure with another conducting film may also be used.

Furthermore, a luminescence layer 45 is formed in a groove (corresponding to the pixel) formed by banks 44a and 44b, which are formed by insulating films (preferably resins). Though only banks 44a and 44b are shown here by omitting a part of the bank in order to clarify the position of the storage capacitor 13504, it is disposed between the power supply line 13506 and the source wiring 34 and to cover a part of these. Note that only 2 pixels are shown in the figure here, but the luminescence layer may be divided to correspond to each of the colors R (red), G (green), and B (blue). A $\pi$ conjugate polymer material is used as an organic EL material for the luminescence layer. Polyparaphenylene vinylenes (PPVs), polyvinyl carbazoles (PVKs), and polyfluoranes can be given as typical polymer materials.

Note that there are various types of PPV organic EL materials, and materials disclosed in H. Shenk, H. Becker, O. Gelsen, E. Kluge, W. Kreuder, and H. Spreitzer, "Polymers for Light Emitting Diodes", Euro Display Proceedings, 1999, pp.33–37, and in Japanese Patent Application Laid-Open No. Hei 10-92567, for example, may be used.

As specific luminescence layers, cyano-polyphenylene vinylene may be used as a red light radiating luminescence layer, polyphenylene vinylene may be used as a green light radiating luminescence layer, and polyphenylene vinylene or polyalkylphenylene may be used as a blue light radiating luminescence layer. The film thickness may be between 30 nm and 150 nm (preferably between 40 nm and 100 nm).

However, the above example is one example of the organic EL materials that can be used as luminescence layers, and it is not necessary to limit use to these materials. An EL layer (a layer for luminescence and for performing carrier motion for luminescence) may be formed by freely combining luminescence layers, charge transport layers, and charge injection layers.

For example, embodiment 21 shows an example using polymer materials as luminescence layers, but low molecular weight organic EL materials may also be used. Further, it is possible to use inorganic materials such as silicon carbide, etc., as charge transport layers and charge injection layers. Known materials can be used for these organic EL materials and inorganic materials.

A laminate structure EL layer, in which a hole injection layer 46 comprising PEDOT (polythiophene) or PAni (polyaniline) is formed on the luminescence layer 45, is used in embodiment 21. An anode 47 is then formed on the hole injection layer 46 from a transparent conducting film. The light generated by the luminescence layer 45 is radiated toward the upper surface (toward the top of the TFT) in the case of embodiment 21, so the anode must be transparent to light. A compound of indium oxide and tin oxide, or a compound of indium oxide and zinc oxide can be used for the transparent conductive film. However, because it is formed after forming the low heat resistance luminescence layer and the hole injection layer, it is preferable to use a material that can be deposited at as low a temperature as possible.

At the point where the anode 47 is formed, an EL element 3505 is complete. Note that what is called the EL element 3505 here indicates the capacitor formed by the pixel electrode (cathode) 43, the luminescence layer 45, the hole injection layer 46, and the anode 47. As shown in FIG. 42A, the pixel electrode 43 nearly matches the area of the pixel, and consequently the entire pixel functions as an EL device. Therefore, the luminescence usage efficiency is very high, and a bright image display is possible.

An additional second passivation film 48 is then formed on the anode 47 in embodiment 21. It is preferable to use a silicon nitride film or a silicon oxynitride film as the second passivation film 48. The purpose of this is the isolation of the EL element and the outside, and has meaning in preventing degradation due to the oxidation of the organic EL material, and in suppressing gas emitted from the organic EL material. The reliability of the EL display can thus be raised.

The EL display panel of embodiment 21 has a pixel section from pixels structured as in FIG. 41, and has a switching TFT with sufficiently low off current value, and a current control TFT that is strong against hot carrier injection. An EL display panel which has high reliability, and in which good image display is possible, can therefore be obtained.

Preferred Embodiment 22

Figure 43:
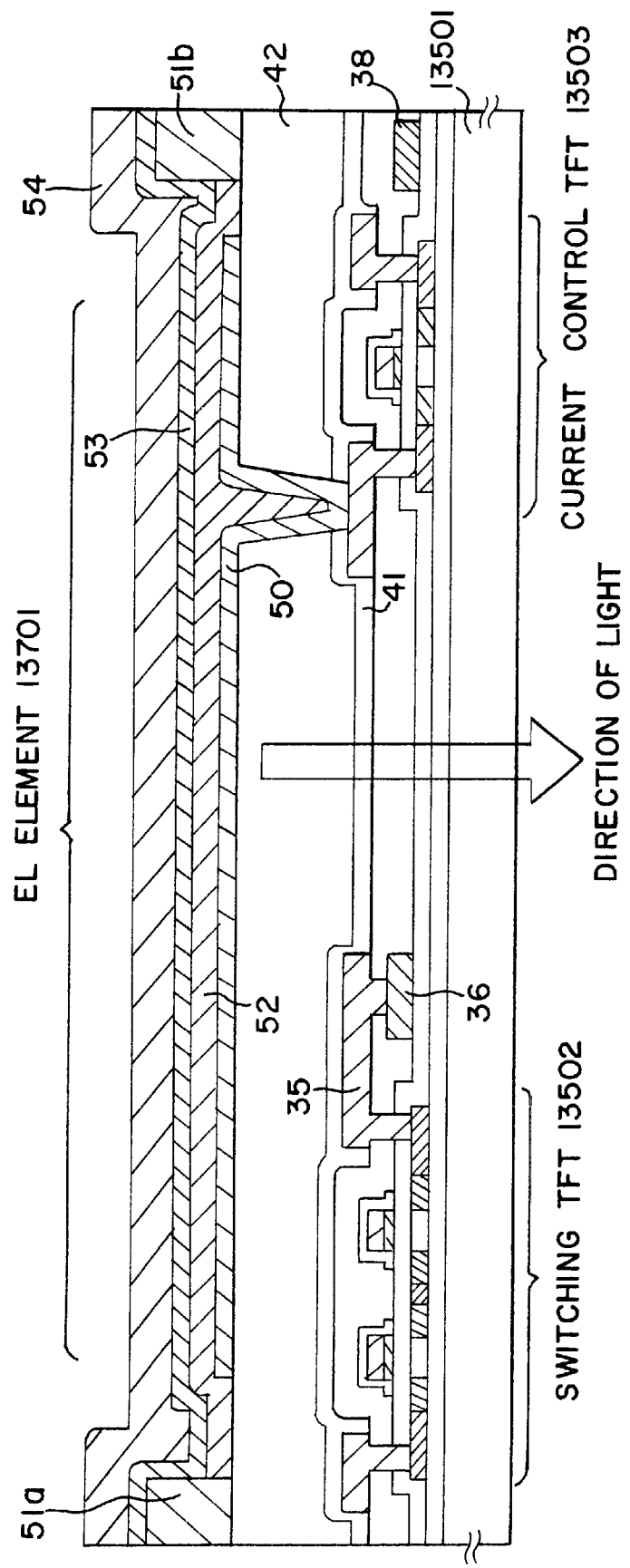
FIG. 43 is a cross-sectional view of a pixel part of an EL panel used in the preferred embodiment 22.

In this preferred embodiment, a structure will be described in which the structure of an EL element 3505 is reversed in the pixel part shown in the preferred embodiment 21. FIG. 43 will be used for description. In this connection, this structure is different only in the EL element and the current control TFT from the structure shown in FIG. 41 and hence the description of the other part will be omitted.

In FIG. 43, as a current control TFT 13503 is used a p-channel type TFT formed by the publicly known method.

In the present preferred embodiment, a transparent conductive film is used as a pixel electrode (anode) 50. To be specific, a conductive film made of a compound of indium oxide and zinc oxide. Of course, a conductive film made of a compound of indium oxide and tin oxide may be used.

Banks 51a, 51b are formed of insulating films and then a polyvinyl carbazole solution is applied to form a luminous layer 52. On the luminous layer 52 are formed an electron injecting layer 53 made of potassium acetyl acetate (referred to as acack) and a cathode 54 made of an aluminum alloy. In this case, the cathode 54 functions also as a passivation film. In this manner, an EL element 13701 is formed.

In the present preferred embodiment, light generated in the luminous layer 52 is radiated toward a substrate on which TFTs are formed, as shown by an arrow.

Preferred Embodiment 23

Figure 44A:
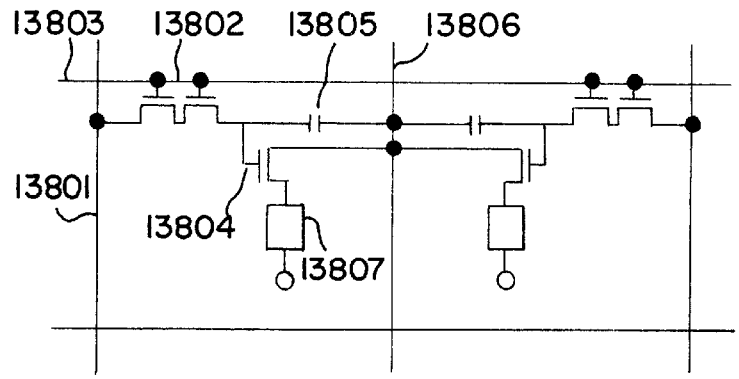
FIGS. 44A to 44C are circuit diagrams of EL panels used in the preferred embodiment 23.
Figure 44B:
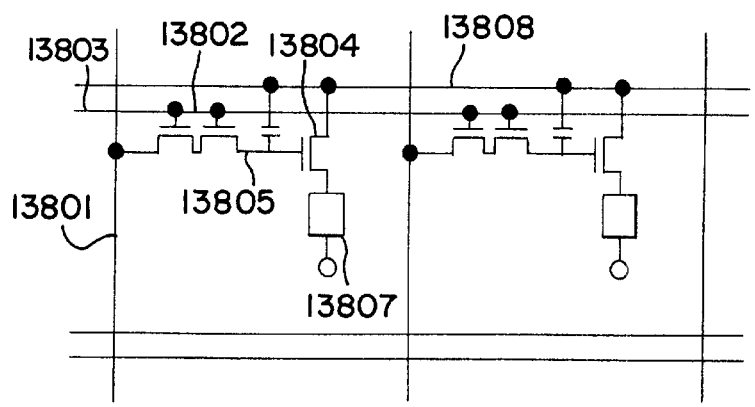
Figure 44C:
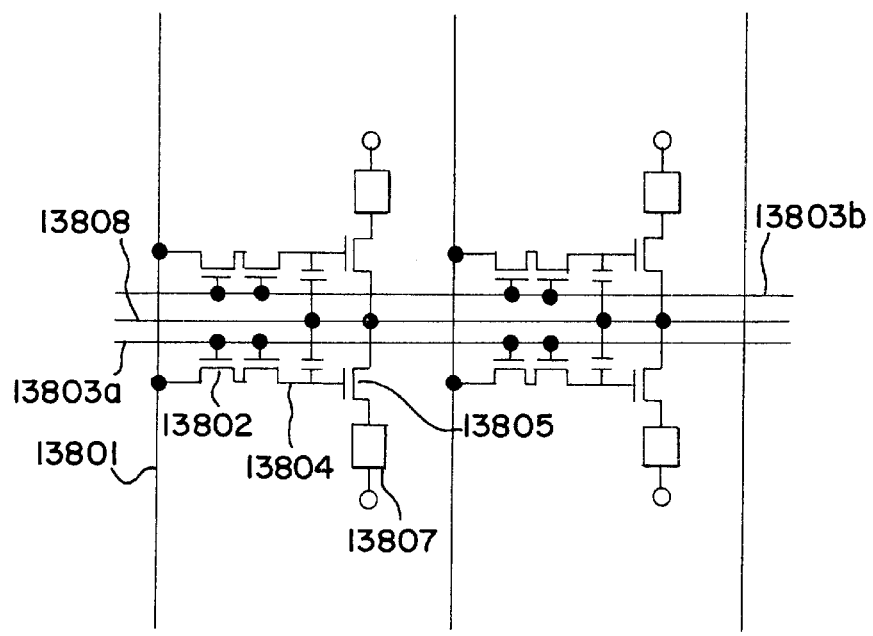

In the present preferred embodiment, an embodiment in which a pixel has a structure different from a circuit diagram shown in FIG. 42(B) will be shown in FIGS. 44(A) to (C). In this connection, a reference numeral 13801 designates a source wiring of a switching TFT 13802, a reference numeral 13803 designates a gate wiring of a switching TFT 13802, a reference numeral 13804 designates a current control TFT, a reference numeral 13805 designates a condenser, reference numerals 13806 and 13808 designate power supply wirings, and a reference numeral 13807 designates an EL element.

FIG. 44(A) shows an embodiment in the case where the power supply wiring 13806 is shared by two pixels: that is to say, this embodiment is characterized in that two pixels are formed symmetrically with respect to a power supply wiring 13806. In this case, since the number of the power supply wiring can be reduced, the pixel part can be further finely defined.

Also, FIG. 44(B) shows an embodiment in the case where the power supply wiring 13808 is formed in parallel to the gate wiring 13803. In this connection, although the power supply wiring 13808 does not overlap the gate wiring 13803 in FIG. 44(B), if they are formed in different layers, they can overlap each other with an insulating layer between them. In this case, since the power supply wiring 13808 and the gate wiring 13803 can share their space, the pixel part can be further finely defined.

An embodiment shown in FIG. 44(C) is characterized in that the power supply wiring 13808 is formed in parallel to the gate wiring 13803, as is the case with FIG. 44(B), and that two pixels are formed symmetrically with respect to a power supply wiring 13808. Also, it is effective that the power supply wiring 13808 overlaps one of the gate wirings 13803. In this case, since the number of the power supply wirings can be reduced, the pixel can be still further finely defined.

Preferred Embodiment 24

The preferred embodiment 21 shown in FIGS. 42(A), (B) has a structure having a condenser 13504 for holding voltage applied to the gate of the current control TFT 13503, but the condenser 13504 can be omitted. The preferred embodiment 10 uses an n-channel type TFT formed by the publicly known method as the current control TFT 13503 and hence has an LDD region overlapping the gate electrode via a gate insulating film. In this overlapping region is formed a parasitic capacitance generally called a gate capacitance, and the present preferred embodiment is characterized in that the parasitic capacitance is positively used as an alternative to the condenser 13504.

The parasitic capacitance changes according to an area where the gate electrode overlaps the LDD region and hence is determined by the length of the LDD region included by the overlapping region.

Also, the condenser 13805 can be omitted in the structure shown in FIGS. 44(A), (B), (C).

According to the goggle type display device in accordance wish the present invention, an optical element such as a lens is integrally formed with a liquid crystal panel. Therefore, the goggle type display device in accordance with the present invention can prevent deterioration in display quality caused by a misalignment between the liquid crystal panel and the lens, which is a problem in a conventional display device.

What is claimed is:

1. A goggle type display device comprising:
    a display unit;
    a lens for enlarging an image displayed by said display unit; and
    a groove provided in said lens,
    wherein said display unit is provided in said groove.

2. A device according to claim 1, wherein said display unit receives a signal by a radio wave from outside and rectifies said signal to make a power source of said display device.

3. A liquid crystal panel constituting said display device according to claim 1, wherein a liquid crystal material used in said liquid crystal panel is an anti-ferroelectric liquid crystal having no substantial threshold.

4. A liquid crystal panel according to claim 3, wherein a diagonal size of a pixel part of said liquid crystal panel is 2 inches or more and a width of a channel of a pixel TFT of said liquid crystal panel ranges from 0.2 $\mu$m to 2 $\mu$m and a thickness of an active layer of said pixel TFT ranges from 10 nm to 50 nm.

5. A liquid crystal panel according to claim 4, wherein the width of a channel of said pixel TFT ranges from 0.2 $\mu$m to 1.3 $\mu$m.

6. A liquid crystal panel constituting said display device according to claim 1, wherein a liquid crystal material used in said liquid crystal panel is an anti-ferroelectric mixed liquid crystal having no substantial threshold.

7. A liquid crystal panel according to claim 6, wherein said liquid crystal material is an anti-ferroelectric mixed liquid crystal having an electrooptical characteristic shaped like a letter V.

8. A goggle type display device comprising:
    a display unit;

a lens for enlarging an image displayed by said display unit;

a groove provided in said lens; and a mask provided on said lens, wherein said display unit is provided in said groove.

9. A device according to claim 8, wherein said display unit receives a signal by a radio wave from outside and rectifies said signal to make a power source of said display device.

10. A liquid crystal panel constituting said display device according to claim 8, wherein a liquid crystal material used in said liquid crystal panel is an anti-ferroelectric liquid crystal having no substantial threshold.

11. A liquid crystal panel according to claim 10, wherein a diagonal size of a pixel part of said liquid crystal panel is 2 inches or more and a width of a channel of a pixel TFT of said liquid crystal panel ranges from 0.2 $\mu$m to 2 $\mu$m and a thickness of an active layer of said pixel TFT ranges from 10 nm to 50 nm.

12. A liquid crystal panel according to claim 11, wherein the width of a channel of said pixel TFT ranges from 0.2 $\mu$m to 1.3 $\mu$m.

13. A liquid crystal panel constituting said display device according to claim 8, wherein a liquid crystal material used in said liquid crystal panel is an anti-ferroelectric mixed liquid crystal having no substantial threshold.

14. A liquid crystal panel according to claim 13, wherein said liquid crystal material is an anti-ferroelectric mixed liquid crystal having an electrooptical characteristic shaped like a letter V.

15. A head-mounted-display device comprising:

a display unit;

a lens for enlarging an image displayed by said display unit; and a groove provided in said lens, wherein said display unit is provided in said groove.

16. A device according to claim 15, wherein said display unit receives a signal by a radio wave from outside and rectifies said signal to make a power source of said display device.

17. A liquid crystal panel constituting said display device according to claim 15, wherein a liquid crystal material used in said liquid crystal panel is an anti-ferroelectric liquid crystal having no substantial threshold.

18. A liquid crystal panel according to claim 17, wherein a diagonal size of a pixel part of said liquid crystal panel is 2 inches or more and a width of a channel of a pixel TFT of said liquid crystal panel ranges from 0.2 $\mu$m to 2 $\mu$m and a thickness of an active layer of said pixel TFT ranges from 10 nm to 50 nm.

19. A liquid crystal panel constituting said display device according to claim 15, wherein a liquid crystal material used in said liquid crystal panel is an anti-ferroelectric mixed liquid crystal having no substantial threshold.

20. A liquid crystal panel according to claim 19, wherein said liquid crystal material is an anti-ferroelectric mixed liquid crystal having an electrooptical characteristic shaped like a letter V.

21. A liquid crystal panel according to claim 18, wherein the width of a channel of said pixel TFT ranges from 0.2 $\mu$m to 1.3 $\mu$m.

22. A goggle type display device comprising:

a display unit for receiving an image signal and for displaying an image;

a lens for enlarging said image displayed by said display unit; and a groove provided in said lens, wherein said display unit is constituted by an EL element, and wherein said display unit is provided in said groove.

23. A goggle type display device for both eyes comprising:

two sets of display units for receiving an image signal and for displaying an image;

two sets of lenses for enlarging said image displayed by said display units; and a groove provided in at least one of said lenses, wherein each of said display units is constituted by an EL element, and wherein one of said display units is provided in said groove.

24. A goggle type display device for a single eye comprising:

a display unit for receiving an image signal and for displaying an image; and a lens for enlarging said image displayed by said display unit; and a groove provided in said lens, wherein said display unit is constituted by an EL element, and wherein said display unit is provided in said groove.

25. A goggle type display device for both eyes comprising:

two sets of display units for receiving an image signal and for displaying an image;

two sets of lenses for enlarging the image displayed by said display units and for passing a forward scene; and a groove provided in at least one of said lenses, wherein each of said display units is constituted by an EL element, and wherein one of said display units is provided in said groove.

* * * * *